(12) United States Patent
Batchelder et al.

(10) Patent No.: US 11,934,129 B2
(45) Date of Patent: Mar. 19, 2024

(54) ADDITIVE MANUFACTURING SYSTEM AND METHOD WITH IMPROVED SURFACE FINISH

(71) Applicant: Evolve Additive Solutions, Inc., Minnetonka, MN (US)

(72) Inventors: J. Samuel Batchelder, Somers, NY (US); Manish Boorugu, Minneapolis, MN (US); Andrew Rice, Chaska, MN (US)

(73) Assignee: Evolve Additive Solutions, Inc., Minnetonka, MN (US)

( * ) Notice: Subject to any disclaimer, the term of this patent is extended or adjusted under 35 U.S.C. 154(b) by 0 days.

(21) Appl. No.: 17/765,325

(22) PCT Filed: Sep. 30, 2020

(86) PCT No.: PCT/US2020/053563
§ 371 (c)(1),
(2) Date: Mar. 30, 2022

(87) PCT Pub. No.: WO2021/067450
PCT Pub. Date: Apr. 8, 2021

(65) Prior Publication Data
US 2022/0326645 A1 Oct. 13, 2022

Related U.S. Application Data

(60) Provisional application No. 62/908,087, filed on Sep. 30, 2019.

(51) Int. Cl.
*G03G 15/00* (2006.01)
*B29C 64/188* (2017.01)
(Continued)

(52) U.S. Cl.
CPC ......... *G03G 15/224* (2013.01); *B29C 64/188* (2017.08); *G03G 15/2021* (2013.01);
(Continued)

(58) Field of Classification Search
CPC ............. G03G 15/167; G03G 15/2021; G03G 15/2064; G03G 15/22; G03G 15/224;
(Continued)

(56) References Cited

U.S. PATENT DOCUMENTS 8,123,999 B2 2/2012 Priedeman et al.
8,246,888 B2 8/2012 Hopkins et al.
(Continued)

FOREIGN PATENT DOCUMENTS

| CN | 114450145 | 5/2022 |
|----|-----------|--------|
| WO | 2019060537 | 3/2019 |
| WO | 2021067450 | 4/2021 |

OTHER PUBLICATIONS

"International Preliminary Report on Patentability," for PCT Application No. PCT/US2020/053563 dated Apr. 14, 2022 (8 pages).
(Continued)

*Primary Examiner* — Sophia S Chen
(74) *Attorney, Agent, or Firm* — Pauly, DeVries Smith & Deffner LLC

(57) ABSTRACT

Embodiments herein relate to 3D printing. In an embodiment, a method for printing an article using a selective toner electrophotographic process ("STEP") includes successively depositing multiple layers of part material and support material, the layers deposited substantially parallel to a first plane; wherein: a) the multiple layers of part material and support material extend in a perpendicular to the first plane; and b) at least some of the layers of part material and support material are separated from each other to form a gap between the layers of part material and layers of support
(Continued)

material; application of heat and pressure to the part material and support material such that a portion of the part material and support material flows into and at least partially fills the gap between the part material and support material.

20 Claims, 14 Drawing Sheets

(51) Int. Cl.
- *G03G 15/20* (2006.01)
- *G03G 15/22* (2006.01)
- *B33Y 10/00* (2015.01)
- *G03G 15/16* (2006.01)
- *G03G 15/34* (2006.01)

(52) U.S. Cl.
CPC .......... *G03G 15/2064* (2013.01); *B33Y 10/00* (2014.12); *G03G 15/167* (2013.01); *G03G 15/344* (2013.01)

(58) Field of Classification Search
CPC .... G03G 15/344; B29C 64/20; B29C 64/141; B29C 64/188; B29C 64/223; B29C 64/295; B33Y 10/00; B33Y 30/00
See application file for complete search history.

(56) References Cited

U.S. PATENT DOCUMENTS

| | | |
|---|---|---|
| 8,459,280 B2 | 6/2013 | Swanson et al. |
| 8,488,994 B2 | 7/2013 | Hanson et al. |
| 8,765,045 B2 | 7/2014 | Zinniel |
| 8,879,957 B2 | 11/2014 | Hanson et al. |
| 10,386,797 B2 | 8/2019 | Manners |
| 2011/0186081 A1 | 8/2011 | Dunn et al. |
| 2013/0186549 A1 | 7/2013 | Comb et al. |
| 2013/0186558 A1 | 7/2013 | Comb et al. |
| 2017/0299973 A1* | 10/2017 | Frauens ................ B29C 64/188 |
| 2018/0111333 A1 | 4/2018 | Lu et al. |
| 2019/0202125 A1 | 7/2019 | Batchelder et al. |
| 2019/0224909 A1 | 7/2019 | Riha et al. |
| 2019/0255769 A1 | 8/2019 | Matsushima |

OTHER PUBLICATIONS

"International Search Report and Written Opinion," for PCT Application No. PCT/US2020/053563 dated Jan. 15, 2021 (12 pages).

* cited by examiner

140

ADDITIVE MANUFACTURING SYSTEM AND METHOD WITH IMPROVED SURFACE FINISH

This application is being filed as a PCT International Patent application on Sep. 30, 2020, in the name of Evolve Additive Solutions, Inc., a U.S. national corporation, applicant for the designation of all countries, and J. Samuel Batchelder, a U.S. Citizen, and Manish Boorugu, a Citizen of India, and Andrew Rice, a U.S. Citizen, inventor(s) for the designation of all countries, and claims priority to U.S. Provisional Patent Application No. 62/908,087, filed Sep. 30, 2019, the contents of which are herein incorporated by reference in its entirety.

FIELD OF THE INVENTION

Embodiments herein relate to methods and systems for forming three-dimensional printed parts, in particular printed parts with an improved surface finish.

BACKGROUND

Additive manufacturing systems are used to build 3D parts from digital representations of the parts using one or more additive manufacturing techniques. Examples of commercially available additive manufacturing techniques include extrusion-based techniques, ink jetting, selective laser sintering, powder/binder jetting, electron beam melting, and stereolithographic processes. For each of these techniques, the digital representation of the 3D part is initially digitally sliced into multiple horizontal layers. For each sliced layer, a tool path is then generated, which provides instructions for the particular additive manufacturing system to form the given layer.

One particularly desirable additive manufacturing method is selective toner electrophotographic process (STEP) additive manufacturing, which allows for rapid, high quality production of 3D parts. STEP manufacturing is performed by applying layers of thermoplastic material that are carried from an electrophotography (EP) engine by a transfer medium (e.g., a rotatable belt or drum). The layer is then transferred to a build platform to print the 3D part (or support structure) in a layer-by-layer manner, where the successive layers are transfused together to produce the 3D part (or support structure). The layers are placed down in an X-Y plane, with successive layers positioned on top of one another in a Z-axis perpendicular to the X-Y plane.

A support structure is sometimes built utilizing the same deposition techniques by which the part material is deposited. The supporting layers or structures are often built underneath overhanging portions or in cavities of parts under construction that are not supported by the part material itself. The part material adheres to the support material during fabrication and the support material is subsequently removable from the completed 3D part when the printing process is complete. In typical STEP processes layers of the part material and support material are deposited next to each other in a common X-Y plane. These layers of part and support material are each built on top of one another (layers of part material built on top of other layers of part material; and layers of support material built on to top of other layers of support material) along the Z-axis to create a composite part that contains both part material and support material.

Although STEM deposition can produce very high quality parts, it is still desirable to form even better parts. For example, in some implementations it is still desirable to have better surface properties, such as improved surface finishes, and in particular smoother surface features. The desire for improved surface finishes, such as smoother surfaces, is particularly true for surfaces outside of the X-Y planes, such as surfaces that have a significant Z-axis component, because these surfaces are sometimes the most difficult on which to obtain a smooth surface finish. These surfaces with a significant Z-axis component are often formed in junction with a support material, and therefore surfaces with improved finish are desired where support material is used to form the part.

SUMMARY

The present application is directed to a method for printing an article using a selective toner electrophotographic process (STEP). The method includes forming a gap (also referenced as a trench or canyon) between adjacent layers of part material and support material, and then applying pressure and heat to transfer some of the part material and support material into the gap. As the part material and support material flow into the gap they come together to form an enhanced surface that is smoother than would otherwise typically be obtained. Part of this enhancement is a result of depositing partial layers of material, referred to herein as enhancement layers, adjacent to the gap. These enhancement layers increase the amount of material (both part and support) adjacent to the gap.

As pressure is applied from the z-axis (or another axis perpendicular to the layers) these enhancement layers function to transfer that pressure down through layers beneath them. The material forming these lower layers (as well as the enhancement layers themselves) are thus under increased pressure, which results in various embodiments a horizontal (x and y direction) flow of material, along with some downward flow of material, into the gap adjacent to the enhancement layers. Once in the gap the material flows upward in the gap. Note that in other implementations the layers are not formed in the same orientation as described above, but the same principals of flow of material into a gap so as to improve surface finish can be observed.

Thus, pressure from the top of the composite, such as applied by a transfuse roller, during formation results in an increased pressure build up in areas having enhancement layers. The increased pressure causes horizontal undertow flow of material (typically both part material and support material) into the gap. The gap gradually fills with material from the bottom, and new flows of material into the gap have an at least partially-upward flow direction in the (z-axis). This upward flow of the part material and support material causes a smoothing of the interface between the part and support materials, thereby forming a smoother finished part.

Thus, in an example embodiment, the enhanced walls of the material along the gap effectively functional like a piston that moves down when rolled by a transfuse roller. Part and support material just outside of the gap is first pressed down. As the tops of the gap sidewalls are pressed down, the material beneath the tops of the trench sidewalls is forced to move sideways into the gap in an undertow. "Undertow" refers to a primarily horizontal flow under the surface as material, also with some downward flow. As material moves out from under the opposing gap walls the part and support material flow into the gap and upward to converge upon one another in the gap. It will be appreciated that in some embodiments the orientation of the layers and gap varies from that described in this example, but similar flow properties and surface improvements are observed. This convergence can occur at the centerline of the gap in some embodiments, such as if the dimensions of the enchantment layers are the same, and the viscosities of the part and support materials are the same. Upon convergence the part and support material moves in the only direction available, which is vertically up the gap because lower portions of the gap are already filled. Generally when the gap is almost filled (the top of the gap is just below the z-axis elevation of the tops of the sidewalls) the flow stops, as the downward pressure over the trench balances the higher downward pressure over the trench sidewalls less the pressure drop from the undertow flow times the viscous flow resistance. It will be appreciated that as described herein the gap is a space between the layers of deposited build material and support material. Multiple layers of build and support material stacked onto one another can form a trench between the layers (the trench essentially multiple gap layers stacked on top of one another). Upon application of transfusion pressure the gap is at least partially (and generally mostly or completely) filled with part and support material flowing into it. Thus the gap (or trench) is filled with material as the layers are deposited and transfusion (described below) occurs.

Thus, in certain embodiments the present application is directed to a method of successively depositing multiple layers of part material and support material, the layers deposited substantially parallel to an X-Y plane (or another plane, referred to herein as a "first plane"). At least some of the layers of part material and support material are offset from each other in the X-Y plane (or other plane) to form a gap or trench between the part material and support material. The multiple layers of part material and support material extend in a Z-direction perpendicular to the X-Y plane, or another direction perpendicular to first plane). Heat and pressure are applied to the top surface of the aggregated layers of part material and support material such that a portion of the part material and support material flows into and at least partially fills the gap between the part material and support material and make contact with one another. The contact area forms an interface that, when the support is removed, results in a part surface that has improved surface properties, including reduced roughness. Typically during this flow into the gap at least a portion of the part material and support material flows upward in a Z direction normal to the X-Y. In some cases the gap is not vertical, but rather slanted or inclined (or has another orientation), in which case the part and support material will flow into that gap, but it may not be normal to the X-Y plane, but rather include a component that is normal to the X-Y plane. The result of this upward (or other direction flow in the case of non-vertical gaps or trenches) flow is that each layer of build material and support material, including material from the edge enhancement layers, is spread vertically over a Z-axis dimension greater than their thickness prior to application of heat and pressure.

In an embodiment, a method for printing an article using a selective toner electrophotographic process is described, the method including successively depositing multiple layers of part material and support material, the layers deposited substantially parallel to an X-Y plane; wherein: a) the multiple layers of part material and support material extend in a Z-direction perpendicular to the X-Y plane; and b) at least some of the layers of part material and support material are offset from each other in the X-Y plane to form a gap between the layers of part material and layers of support material; application of heat and pressure to the part material and support material such that a portion of the part material and support material flows into and at least partially fills the gap between the part material and support material; and at least a portion of the part material and support material flows upward with a component in a Z-direction normal to the X-Y plane.

In an embodiment, the method can further include deposit of an edge enhancement layer between at least some of the multiple layers of part material and support material; the edge enhancement layers can include a layer of part material or a layer of support material selectively printed adjacent to the gap.

In an embodiment, the printed part material or support material of the edge enhancement layers has a volume substantially equal to the volume of the gap.

In an embodiment, an edge enhancement layer is deposited every second, third, fourth, fifth, sixth, seventh, eighth, ninth, or tenth layer.

In an embodiment, the edge enhancement layer has an average width of 5 to 15 pixels.

In an embodiment, the average width of the gap between the part regions and support regions is from 6 to 12 pixels.

In an embodiment, the gap is from 6 to 12 pixels in width and the average width of the edge enhancement layer is from 10 to 20 pixels in width.

In an embodiment, the average width of the gap between the part material and support material is from 5 to 25 pixels.

In an embodiment, the part region forms a first perimeter defining a first side of the gap and the support region forms a second perimeter defining a second side of the gap.

In an embodiment, the method further includes reheating and recooling the build surface so as to cause the gap to diminish and the part region surface to become progressively smoother.

In an embodiment, the surface roughness of vertical part surfaces is less than 8 um.

In an embodiment, the surface roughness of vertical part surfaces is less than 4 um.

In an embodiment, the surface roughness of vertical part surfaces is less than 2 um.

In an embodiment, the surface roughness of vertical part surfaces is less than 1.5 um.

Definitions

Unless otherwise specified, the following terms as used herein have the meanings provided below:

The term "copolymer" refers to a polymer having two or more monomer species.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the inventive scope of the present disclosure.

Reference to "a" chemical compound refers one or more molecules of the chemical compound, rather than being limited to a single molecule of the chemical compound. Furthermore, the one or more molecules may or may not be identical, so long as they fall under the category of the chemical compound.

The terms "at least one" and "one or more of" an element are used interchangeably, and have the same meaning that includes a single element and a plurality of the elements, and may also be represented by the suffix "(s)" at the end of the element.

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, the terms "above", "below", "top", "bottom", and the like are relative to the given axis.

The terms "about" and "substantially" are used herein with respect to measurable values and ranges due to expected variations known to those skilled in the art (e.g., limitations and variabilities in measurements).

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

The term "selective deposition" refers to an additive manufacturing technique where one or more layers of particles are fused to previously deposited layers utilizing heat and pressure over time where the particles fuse together to form a layer of the part and also fuse to the previously printed layer.

The term "electrostatography" refers to the formation and utilization of latent electrostatic charge patterns to form an image of a layer of a part, a support structure or both on a surface. Electrostatography includes, but is not limited to, electrophotography where optical energy is used to form the latent image, ionography where ions are used to form the latent image and/or electron beam imaging where electrons are used to form the latent image.

The terms "resilient material" and "flowable material" describe distinct materials used in the printing of a 3D part and support. The resilient material has a higher viscosity and/or storage modulus relative to the flowable material.

Unless otherwise specified, pressures referred to herein are based on atmospheric pressure (i.e. one atmosphere).

DETAILED DESCRIPTION

Embodiments of the present disclosure relate to a selective deposition-based additive manufacturing system, such as an electrostatography-based additive manufacturing system, to print 3D parts and/or support structures with high resolution and smooth surfaces. During a printing operation, electrostatographic engines develop or otherwise image each layer of the part and support materials using the electrostatographic process. The developed layers are then transferred to a layer transfusion assembly where they are transfused (e.g., using heat and/or pressure over time) to print one or more 3D parts and support structures in a layer-by-layer manner.

Figure 1:
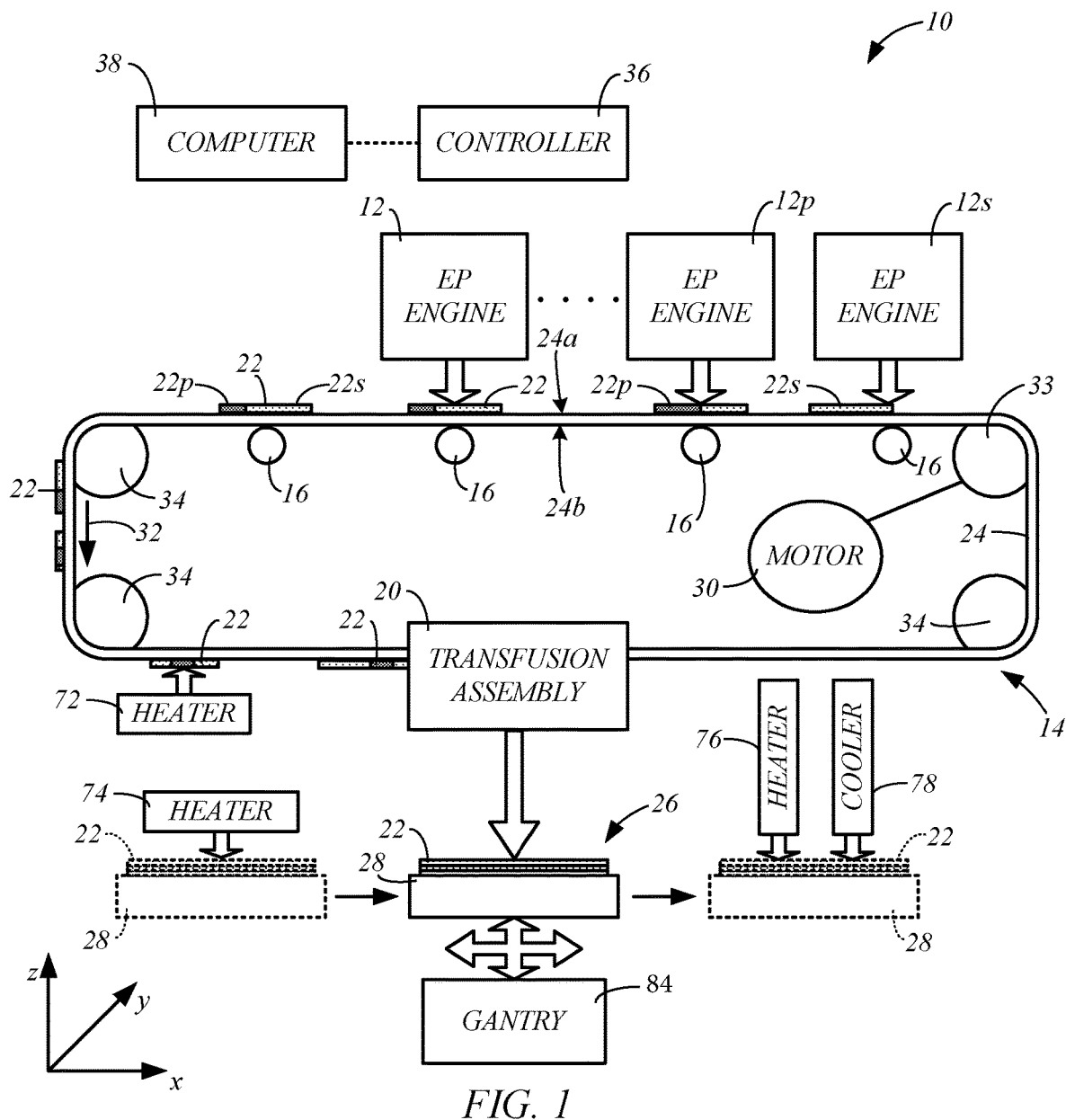
FIG. 1 is a schematic front view of an exemplary electrophotography-based additive manufacturing system for printing 3D parts and support structures from part and support materials, in accordance with embodiments of the present disclosure.

FIGS. 1 to 4 show example components of STEP manufacturing systems, while FIGS. 5 to 20 show further aspects of methods and techniques for producing 3D printed parts with improved surface properties. FIG. 1 is a simplified diagram of an exemplary electrophotography-based additive manufacturing system 10 configured to perform a selective deposition process to printing 3D parts and associated support structures, in accordance with embodiments of the present disclosure. As shown in FIG. 1, system 10 includes one or more EP engines, generally referred to as 12, such as EP engines 12p and 12s, a transfer assembly 14, biasing mechanisms 16, and a transfusion assembly 20. Examples of suitable components and functional operations for system 10 include those disclosed in Hanson et al., U.S. Pat. Nos. 8,879,957 and 8,488,994, and in Comb et al., U.S. Patent Publication Nos. 2013/0186549 and 2013/0186558.

The EP engines 12p and 12s are imaging engines for respectively imaging or otherwise developing layers, generally referred to as 22, of the powder-based part and support materials, where the part and support materials are each preferably engineered for use with the particular architecture of the EP engine 12p or 12s. As discussed below, the developed layers 22 are transferred to a transfer medium (such as belt 24) of the transfer assembly 14, which delivers the layers 22 to the transfusion assembly 20. The transfusion assembly 20 operates to build the 3D part 26, which may include support structures and other features, in a layer-by-layer manner by transfusing the layers 22 together on a build platform 28.

In some embodiments, the transfer medium includes a belt 24, as shown in FIG. 1. Examples of suitable transfer belts for the transfer medium or belt 24 include those disclosed in Comb et al., U.S. Patent Application Publication Nos. 2013/0186549 and 2013/0186558. In some embodiments, the belt 24 includes front surface 24a and rear surface 24b, where front surface 24a faces the EP engines 12, and the rear surface 24b is in contact with the biasing mechanisms 16.

In some embodiments, the transfer assembly 14 includes one or more drive mechanisms that include, for example, a motor 30 and a drive roller 33, or other suitable drive mechanism, and operate to drive the transfer medium or belt 24 in a feed direction 32. In some embodiments, the transfer assembly 14 includes idler rollers 34 that provide support for the belt 24. The example transfer assembly 14 illustrated in FIG. 1 is highly simplified and may take on other configurations. Additionally, the transfer assembly 14 may include additional components that are not shown in order to simplify the illustration, such as, for example, components for maintaining a desired tension in the belt 24, a belt cleaner for removing debris from the surface 24a that receives the layers 22, and other components.

The EP engine 12s develops layer or image portions 22s of powder-based support material, and the EP engine 12p develops layer or image portions 22p of powder-based part/build material. In some embodiments, the EP engine 12s is positioned upstream from the EP engine 12p relative to the feed direction 32, as shown in FIG. 1. In alternative embodiments, the arrangement of the EP engines 12p and 12s may be reversed such that the EP engine 12p is upstream from the EP engine 12s relative to the feed direction 32. In further alternative embodiments, system 10 may include three or more EP engines 12 for printing layers of additional materials, as indicated in FIG. 1.

Example system 10 also includes controller 36, which represents one or more processors that are configured to execute instructions, which may be stored locally in memory of the system 10 or in memory that is remote to the system 10, to control components of the system 10 to perform one or more functions described herein. In some embodiments, the controller 36 includes one or more control circuits, microprocessor-based engine control systems, and/or digitally-controlled raster imaging processor systems, and is configured to operate the components of system 10 in a synchronized manner based on printing instructions received from a host computer 38 or a remote location.

In some embodiments, the host computer 38 includes one or more computer-based systems that are configured to communicate with controller 36 to provide the print instructions (and other operating information). For example, the host computer 38 may transfer information to the controller 36 that relates to the sliced layers of the 3D parts and support structures, thereby allowing the system 10 to print the 3D parts 26 and support structures in a layer-by-layer manner. The controller 36 may also use signals from one or more sensors to assist in properly registering the printing of the part or image portion 22p and/or the support structure or image portion 22s with a previously printed corresponding support structure portion 22s or part portion 22p on the belt 24 to form the individual layers 22.

The components of system 10 may be retained by one or more frame structures (not shown for simplicity). Additionally, the components of system 10 may be retained within an enclosable housing (not shown for simplicity) that prevents components of the system 10 from being exposed to ambient light during operation.

Figure 2:
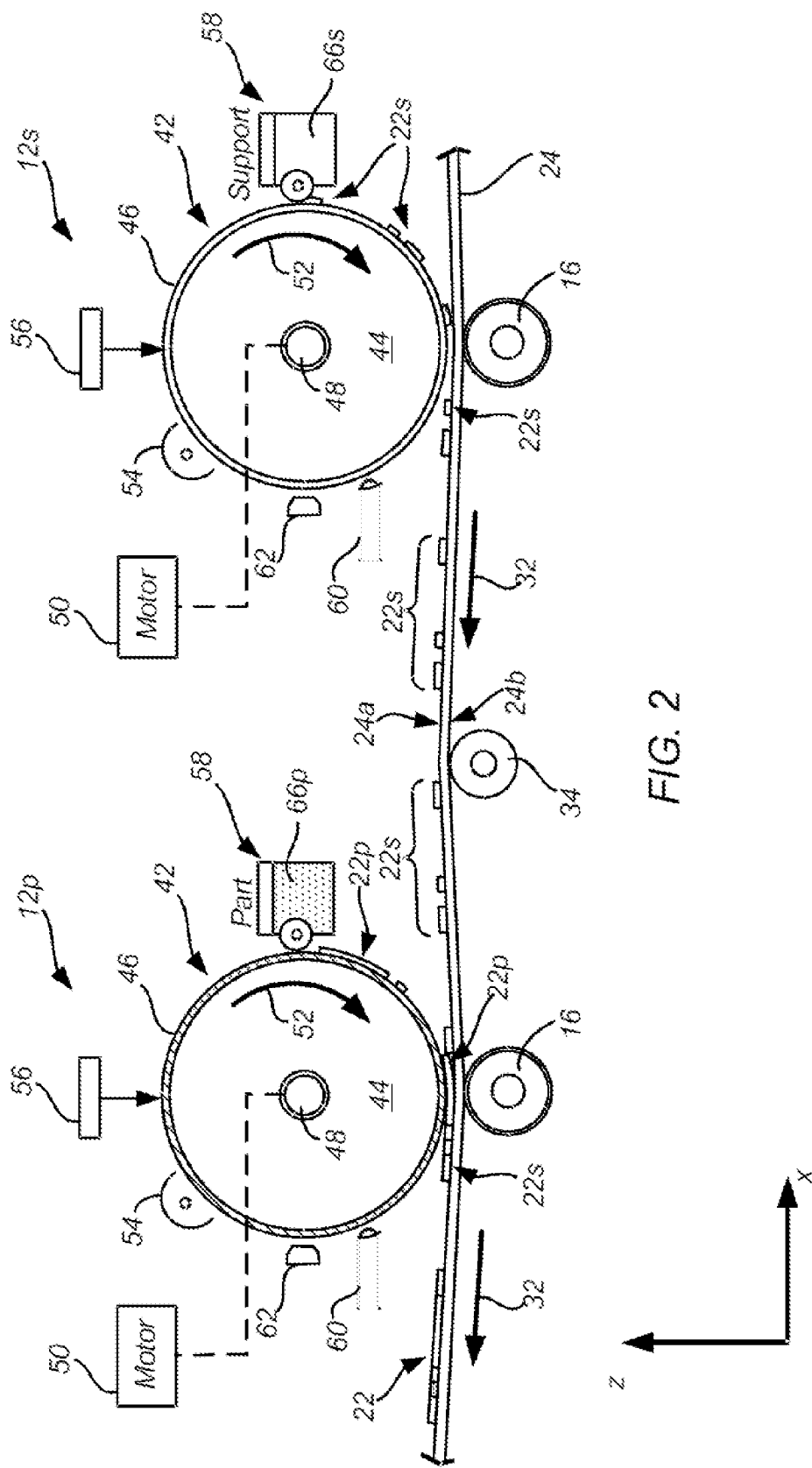
FIG. 2 is a schematic front view of a pair of electrophotography engines of the system for developing layers of the part and support materials, in accordance with embodiments of the present disclosure.

FIG. 2 is a schematic front view of the EP engines 12p and 12s of the system 10, in accordance with example embodiments of the present disclosure. In the illustrated embodiment, the EP engines 12p and 12s may include the same components, such as a photoconductor drum 42 having a conductive drum body 44 and a photoconductive surface 46. The conductive drum body 44 is an electrically-conductive drum (e.g., fabricated from copper, aluminum, tin, or the like) that is electrically grounded and configured to rotate around a shaft 48. The shaft 48 is correspondingly connected to a drive motor 50, which is configured to rotate the shaft 48 (and the photoconductor drum 42) in the direction of arrow 52 at a constant rate.

The photoconductive surface 46 can be a thin film extending around the circumferential surface of the conductive drum body 44, and is preferably derived from one or more photoconductive materials, such as amorphous silicon, selenium, zinc oxide, organic materials, and the like. As discussed below, the surface 46 is configured to receive latent-charged images of the sliced layers of a 3D part or support structure (or negative images), and to attract charged particles of the part or support material to the charged or discharged image areas, thereby creating the layers of the 3D part or support structure.

As further shown, each of the example EP engines 12p and 12s also includes a charge inducer 54, an imager 56, a development station 58, a cleaning station 60, and a discharge device 62, each of which may be in signal communication with the controller 36. The charge inducer 54, the imager 56, the development station 58, the cleaning station 60, and the discharge device 62 accordingly define an image-forming assembly for the surface 46 while the drive motor 50 and the shaft 48 rotate the photoconductor drum 42 in the direction 52.

Each of the EP engines 12 uses the powder-based material (e.g., polymeric or thermoplastic toner), generally referred to herein by reference character 66, to develop or form the layers 22. In some embodiments, the image-forming assembly for the surface 46 of the EP engine 12s is used to form support layers 22s (e.g., image portions) of powder-based support material 66s, where a supply of the support material 66s may be retained by the development station 58 (of the EP engine 12s) along with carrier particles. Similarly, the image-forming assembly for the surface 46 of the EP engine 12p is used to form part layers 22p (e.g., image portion) of powder-based part material 66p, where a supply of the part material 66p may be retained by the development station 58 (of the EP engine 12p) along with carrier particles. Additional EP engines 12 may be included that utilize other support or part materials 66.

The charge inducer 54 is configured to generate a uniform electrostatic charge on the surface 46 as the surface 46 rotates in the direction 52 past the charge inducer 54. Suitable devices for the charge inducer 54 include corotrons, scorotrons, charging rollers, and other electrostatic charging devices.

Each imager 56 is a digitally-controlled, pixel-wise light exposure apparatus configured to selectively emit electromagnetic radiation toward the uniform electrostatic charge on the surface 46 as the surface 46 rotates in the direction 52 the past imager 56. The selective exposure of the electromagnetic radiation to the surface 46 is directed by the controller 36, and causes discrete pixel-wise locations of the electrostatic charge to be removed (i.e., discharged to ground), thereby forming latent image charge patterns on the surface 46.

Suitable devices for the imager 56 include scanning laser (e.g., gas or solid-state lasers) light sources, light emitting diode (LED) array exposure devices, and other exposure device conventionally used in 2D electrophotography systems. In alternative embodiments, suitable devices for the charge inducer 54 and the imager 56 include ion-deposition systems configured to selectively directly deposit charged ions or electrons to the surface 46 to form the latent image charge pattern.

Each development station 58 is an electrostatic and magnetic development station or cartridge that retains the supply of the part material 66p or the support material 66s, along with carrier particles. The development stations 58 may function in a similar manner to single or dual component development systems and toner cartridges used in 2D electrophotography systems. For example, each development station 58 may include an enclosure for retaining the part material 66p or the support material 66s and carrier particles. When agitated, the carrier particles generate triboelectric charges to attract the powders of the part material 66p or the support material 66s, which charges the attracted powders to a desired sign and magnitude, as discussed below.

Each development station 58 may also include one or more devices for transferring the charged part or the support material 66p or 66s to the surface 46, such as conveyors, fur brushes, paddle wheels, rollers, and/or magnetic brushes. For instance, as the surface 46 (containing the latent charged image) rotates from the imager 56 to the development station 58 in the direction 52, the charged part material 66p or the support material 66s is attracted to the appropriately charged regions of the latent image on the surface 46, utilizing either charged area development or discharged area development (depending on the electrophotography mode being utilized). This creates successive layers 22p or 22s as the photoconductor drum continues to rotate in the direction 52, where the successive layers 22p or 22s correspond to the successive sliced layers of the digital representation of the 3D part or support structure.

The successive layers 22p or 22s are then rotated with the surface 46 in the direction 52 to a transfer region in which layers 22p or 22s are successively transferred from the photoconductor drum 42 to the belt 24 or other transfer medium, as discussed below. While illustrated as a direct engagement between the photoconductor drum 42 and the belt 24, in some preferred embodiments, the EP engines 12p and 12s may also include intermediary transfer drums and/or belts, as discussed further below.

After a given layer 22p or 22s is transferred from the photoconductor drum 42 to the belt 24 (or an intermediary transfer drum or belt), the drive motor 50 and the shaft 48 continue to rotate the photoconductor drum 42 in the direction 52 such that the region of the surface 46 that previously held the layer 22p or 22s passes the cleaning station 60. The cleaning station 60 is a station configured to remove any residual, non-transferred portions of part or support material 66p or 66s. Suitable devices for the cleaning station 60 include blade cleaners, brush cleaners, electrostatic cleaners, vacuum-based cleaners, and combinations thereof.

After passing the cleaning station 60, the surface 46 continues to rotate in the direction 52 such that the cleaned regions of the surface 46 pass the discharge device 62 to remove any residual electrostatic charge on the surface 46, prior to starting the next cycle. Suitable devices for the discharge device 62 include optical systems, high-voltage alternating-current corotrons and/or scorotrons, one or more rotating dielectric rollers having conductive cores with applied high-voltage alternating-current, and combinations thereof.

The biasing mechanisms 16 are configured to induce electrical potentials through the belt 24 to electrostatically attract the layers 22p and 22s from the EP engines 12p and 12s to the belt 24. Because the layers 22p and 22s are each only a single layer increment in thickness at this point in the process, electrostatic attraction is suitable for transferring the layers 22p and 22s from the EP engines 12p and 12s to the belt 24.

The controller 36 preferably rotates the photoconductor drums of the EP engines 12p and 12s at the same rotational rates that are synchronized with the line speed of the belt 24 and/or with any intermediary transfer drums or belts. This allows the system 10 to develop and transfer the layers 22p and 22s in coordination with each other from separate developer images. In particular, as shown, each part layer 22p may be transferred to the belt 24 with proper registration with each support layer 22s to produce a combined part and support material layer or combined image layer, which is generally designated as layer 22. As can be appreciated, some of the layers 22 transferred to the layer transfusion assembly 20 may only include support material 66s or may only include part material 66p, depending on the particular support structure and 3D part geometries and layer slicing.

In an alternative embodiment, the part layers 22p and the support layers 22s may optionally be developed and transferred along the belt 24 separately, such as with alternating layers 22p and 22s. These successive, alternating layers 22p and 22s may then be transferred to layer transfusion assembly 20, where they may be transfused separately to form the layer 22 and print or build the 3D part 26 and support structure.

Figure 3:
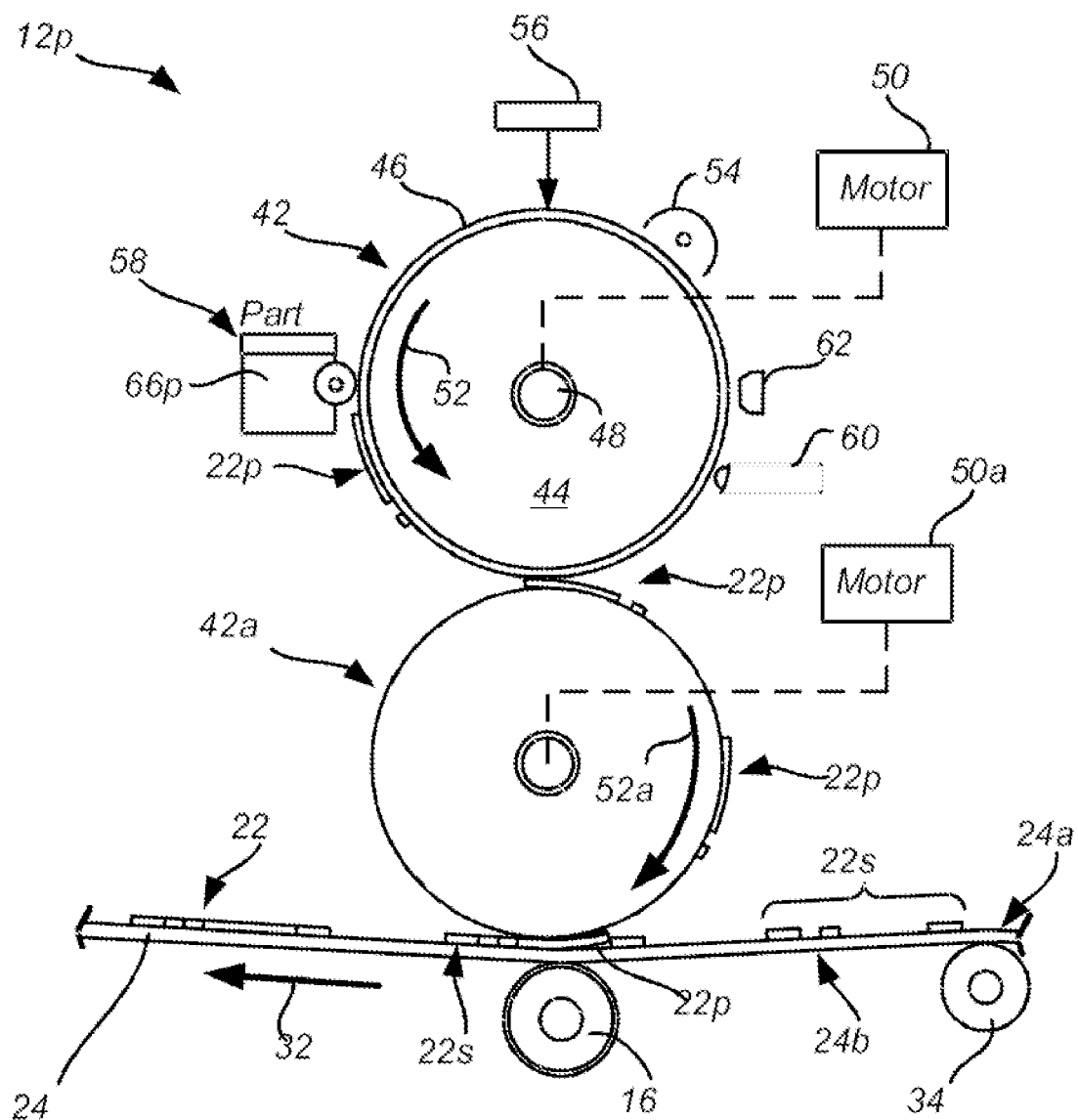
FIG. 3 is a schematic front view of an alternative electrophotography engine, which includes an intermediary drum or belt, in accordance with embodiments of the present disclosure.

In a further alternative embodiment, one or both of the EP engines 12p and 12s may also include one or more intermediary transfer drums and/or belts between the photoconductor drum 42 and the belt or transfer medium or belt 24. For example, as shown in FIG. 3, the EP engine 12p may also include an intermediary drum 42a that rotates in the direction 52a that opposes the direction 52, in which drum 42 is rotated, under the rotational power of motor 50a. The intermediary drum 42a engages with the photoconductor drum 42 to receive the developed layers 22p from the photoconductor drum 42, and then carries the received developed layers 22p and transfers them to the belt 24.

The EP engine 12s may include the same arrangement of an intermediary drum 42a for carrying the developed layers 22s from the photoconductor drum 42 to the belt 24. The use of such intermediary transfer drums or belts for the EP engines 12p and 12s can be beneficial for thermally isolating the photoconductor drum 42 from the belt 24, if desired.

Figure 4:
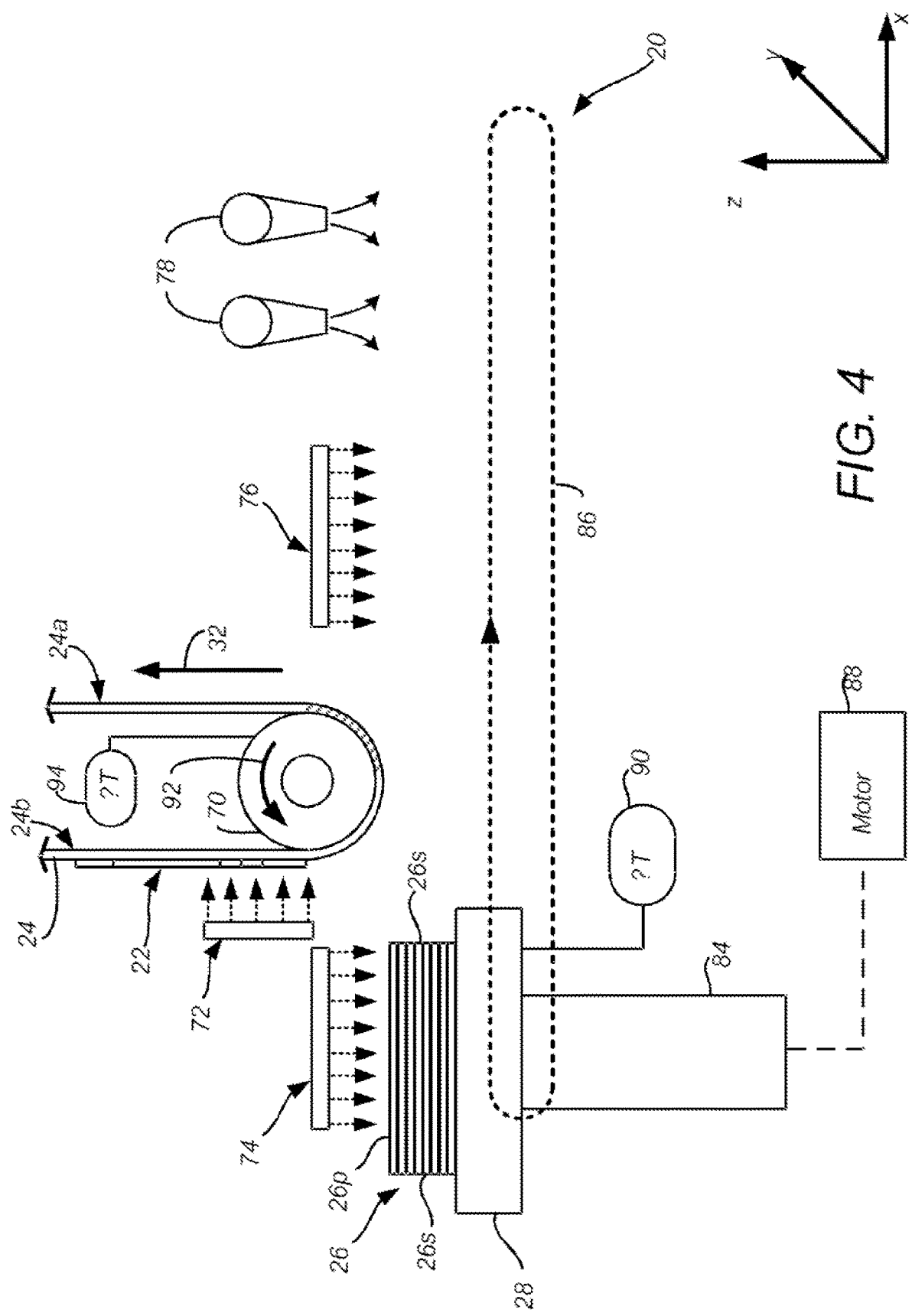
FIG. 4 is a schematic front view of a layer transfusion assembly of the system for performing layer transfusion steps with the developed layers, in accordance with embodiments of the present disclosure.

FIG. 4 illustrates an embodiment of the layer transfusion assembly 20. As shown, the exemplary transfusion assembly 20 includes the build platform 28, a nip roller 70, and pre-transfusion heaters 72 and 74. In some embodiments, the transfusion assembly includes, an optional post-transfusion heater 76, and/or a cooler (e.g., air jets 78 or other cooling units), as shown in FIGS. 1 and 4. The build platform 28 is a platform assembly or platen of system 10 that is configured to receive the heated combined layers 22 (or separate layers 22*p* and 22*s*) for printing the part 26, which includes a 3D part 26*p* formed of the part layers 22*p*, and support structure 26*s* formed of the support layers 22*s*, in a layer-by-layer manner. In some embodiments, the build platform 28 may include removable film substrates (not shown) for receiving the printed layers 22, where the removable film substrates may be restrained against build platform using any suitable technique (e.g., vacuum drawing).

The build platform 28 is supported by a gantry 84 or other suitable mechanism, which can be configured to move the build platform 28 along the z-axis and the x-axis (and, optionally, also the y-axis), as illustrated schematically in FIG. 1 (the y-axis being into and out of the page in FIG. 1, with the z-, x- and y-axes being mutually orthogonal, following the right-hand rule). The layers are put down generally parallel to an x-y plane, and the layers stack on top of one another along the z-axis. The gantry 84 may produce cyclical movement patterns relative to the nip roller 70 and other components, as illustrated by broken line 86 in FIG. 4. The particular movement pattern of the gantry 84 can follow essentially any desired path suitable for a given application. The gantry 84 may be operated by a motor 88 based on commands from the controller 36, where the motor 88 may be an electrical motor, a hydraulic system, a pneumatic system, or the like. In one embodiment, the gantry 84 can included an integrated mechanism that precisely controls movement of the build platform 28 in the z- and x-axis directions (and optionally the y-axis direction). In alternate embodiments, the gantry 84 can include multiple, operatively-coupled mechanisms that each control movement of the build platform 28 in one or more directions, for instance, with a first mechanism that produces movement along both the z-axis and the x-axis and a second mechanism that produces movement along only the y-axis. The use of multiple mechanisms can allow the gantry 84 to have different movement resolution along different axes. Moreover, the use of multiple mechanisms can allow an additional mechanism to be added to an existing mechanism operable along fewer than three axes.

In the illustrated embodiment, the build platform 28 can be heatable with heating element 90 (e.g., an electric heater). The heating element 90 is configured to heat and maintain the build platform 28 at an elevated temperature that is greater than room temperature (25° C.), such as at a desired average part temperature of 3D part 26*p* and/or support structure 26*s*, as discussed in Comb et al., U.S. Patent Application Publication Nos. 2013/0186549 and 2013/0186558. This allows the build platform 28 to assist in maintaining 3D part 26*p* and/or support structure 26*s* at this average part temperature.

The nip roller 70 is an example heatable element or heatable layer transfusion element, which is configured to rotate around a fixed axis with the movement of the belt 24. In particular, the nip roller 70 may roll against the rear surface 22*s* in the direction of arrow 92 while the belt 24 rotates in the feed direction 32. In the shown embodiment, the nip roller 70 is heatable with a heating element 94 (e.g., an electric heater). The heating element 94 is configured to heat and maintain nip roller 70 at an elevated temperature that is greater than room temperature (25° C.), such as at a desired transfer temperature for the layers 22.

The pre-transfusion heater 72 includes one or more heating devices (e.g., an infrared heater and/or a heated air jet) that are configured to heat the layers 22 on the belt 24 to a selected temperature of the layer 22, such as up to a fusion temperature of the part material 66*p* and the support material 66*s*, prior to reaching nip roller 70. Each layer 22 desirably passes by (or through) the heater 72 for a sufficient residence time to heat the layer 22 to the intended transfer temperature. The pre-transfusion heater 74 may function in the same manner as the heater 72, and heats the top surfaces of the 3D part 26*p* and support structure 26*s* on the build platform 28 to an elevated temperature, and in one embodiment to supply heat to the layer upon contact.

The part and support materials 66*p* and 66*s* of the layers 22*p* and 22*s* may be heated together with the heater 72 to substantially the same temperature, and the part and support materials 66*p* and 66*s* at the top surfaces of the 3D part 26*p* and support structure 26*s* may be heated together with heater 74 to substantially the same temperature. This allows the part layers 22*p* and the support layers 22*s* to be transfused together to the top surfaces of the 3D part 26*p* and the support structure 26*s* in a single transfusion step as the combined layer 22. As discussed below, a gap can be placed between the support layers 22*s* and part layers 22*p*, and under heat and pressure part and support material are pressed together in a manner such as to produce an improved interface with reduced surface roughness.

An optional post-transfusion heater 76 may be provided downstream from nip roller 70 and upstream from air jets 78, and configured to heat the transfused layers 22 to an elevated temperature in a single post-fuse step.

As mentioned above, in some embodiments, prior to building the part 26 on the build platform 28, the build platform 28 and the nip roller 70 may be heated to their selected temperatures. For example, the build platform 28 may be heated to the average part temperature (e.g., bulk temperature) of 3D part 26*p* and support structure 26*s*. In comparison, the nip roller 70 may be heated to a desired transfer temperature or nip entrance temperature for the layers 22.

As further shown in FIG. 4, during operation, the gantry 84 may move the build platform 28 (with 3D part 26*p* and support structure 26*s*) in a reciprocating pattern 86. In particular, the gantry 84 may move the build platform 28 along the x-axis below, along, or through the heater 74. The heater 74 heats the top surfaces of 3D part 26*p* and support structure 26*s* to an elevated temperature, such as the transfer temperatures of the part and support materials. As discussed in Comb et al., U.S. Patent Application Publication Nos. 2013/0186549 and 2013/0186558, the heaters 72 and 74 may heat the layers 22 and the top surfaces of 3D part 26*p* and support structure 26*s* to about the same temperatures to provide a consistent transfusion interface temperature. Alternatively, the heaters 72 and 74 may heat layers 22 and the top surfaces of 3D part 26*p* and support structure 26*s* to different temperatures to attain a desired transfusion interface temperature.

The continued rotation of the belt 24 and the movement of the build platform 28 align or register the heated layer 22 (e.g., combined image layer) with the heated top surfaces of 3D part 26*p* and support structure 26*s* with proper registration along the x-axis. The gantry 84 may continue to move the build platform 28 along the x-axis, at a rate that is synchronized with the rotational rate of the belt 24 in the feed direction 32 (i.e., the same directions and speed). This causes the rear surface 24*b* of the belt 24 to rotate around the nip roller 70 to nip the belt 24 and the heated layer 22 against the top surfaces of 3D part 26*p* and support structure 26*s*. This presses the heated layer 22 between the heated top surfaces of 3D part 26*p* and support structure 26*s* at the location of the nip roller 70, which at least partially transfuses the heated layer 22 to the top layers of 3D part 26p and support structure 26s.

As the transfused layer 22 passes the nip of the nip roller 70, the belt 24 wraps around the nip roller 70 to separate and disengage from the build platform 28. This assists in releasing the transfused layer 22 from the belt 24, allowing the transfused layer 22 to remain adhered to 3D part 26p and support structure 26s. Maintaining the transfusion interface temperature at a transfer temperature that is higher than its glass transition temperature, but lower than its fusion temperature, allows the heated layer 22 to be hot enough to adhere to the 3D part 26p and support structure 26s, while also being cool enough to readily release from the belt 24. Additionally, the close melt rheologies of the part and support materials allow them to be transfused in the same step. The temperature and pressures can be selected, as is discussed below, to promote flow of part material and support material into a gap between the two materials. Often the rheologies are preferably close, they can be transfused with glass transition temperatures that are significantly different from one another in some constructions. This flow into the gap, typically accompanied by an upward movement of the part and support material, results in a smoother interface between the part and support, plus a smoother surface for the part after removal of the support.

After release, the gantry 84 continues to move the build platform 28 along the x-axis to the post-transfusion heater 76. At optional post-transfusion heater 76, the top-most layers of 3D part 26p and the support structure 26s (including the transfused layer 22) may then be heated to at least the fusion temperature of the thermoplastic-based powder in a post-fuse or heat-setting step. This optionally heats the material of the transfused layer 22 to a highly fusable state such that polymer molecules of the transfused layer 22 quickly interdiffuse (also referred to as reptate) to achieve a high level of interfacial entanglement with 3D part 26p and support structure 26s.

Additionally, as the gantry 84 continues to move the build platform 28 along the x-axis past the post-transfusion heater 76 to the air jets 78, the air jets 78 blow cooling air towards the top layers of 3D part 26p and support structure 26s. This actively cools the transfused layer 22 down to the average part temperature, as discussed in Comb et al., U.S. Patent Application Publication Nos. 2013/0186549 and 2013/0186558.

To assist in keeping the 3D part 26p and support structure 26s at the average part temperature, in some embodiments, the heater 74 and/or the heater 76 may operate to heat only the top-most layers of 3D part 26p and support structure 26s. For example, in embodiments in which heaters 72, 74, and 76 are configured to emit infrared radiation, the 3D part 26p and support structure 26s may include heat absorbers and/or other colorants configured to restrict penetration of the infrared wavelengths to within the top-most layers. Alternatively, the heaters 72, 74, and 76 may be configured to blow heated air across the top surfaces of 3D part 26p and support structure 26s. In either case, limiting the thermal penetration into 3D part 26p and support structure 26s allows the top-most layers to be sufficiently transfused, while also reducing the amount of cooling required to keep 3D part 26p and support structure 26s at the average part temperature. However generally sufficient thermal penetration is desired to promote flow of part material and support material into gaps positioned at the interface between the part and support material.

The gantry 84 may then actuate the build platform 28 downward, and move the build platform 28 back along the x-axis to a starting position along the x-axis, following the reciprocating rectangular pattern 86. The build platform 28 desirably reaches the starting position for proper registration with the next layer 22. In some embodiments, the gantry 84 may also actuate the build platform 28 and 3D part 26p/support structure 26s upward for proper registration with the next layer 22. The same process may then be repeated for each remaining layer 22 of 3D part 26p and support structure 26s.

After the transfusion operation is completed, the resulting 3D part 26p and support structure 26s may be removed from system 10 and undergo one or more post-printing operations. For example, support structure 26s may be sacrificially removed from 3D part 26p using an aqueous-based solution, such as an aqueous alkali solution. Under this technique, support structure 26s may at least partially dissolve in the solution, separating it from 3D part 26p in a hands-free manner.

In comparison, part materials are chemically resistant to aqueous alkali solutions. This allows the use of an aqueous alkali solution to be employed for removing the sacrificial support structure 26s without degrading the shape or quality of 3D part 26p. Examples of suitable systems and techniques for removing support structure 26s in this manner include those disclosed in Swanson et al., U.S. Pat. No. 8,459,280; Hopkins et al., U.S. Pat. No. 8,246,888; and Dunn et al., U.S. Patent Application Publication No. 2011/0186081; each of which are incorporated by reference to the extent that they do not conflict with the present disclosure.

Furthermore, after support structure 26s is removed, 3D part 26p may undergo one or more additional post-printing processes, such as surface treatment processes. Examples of suitable surface treatment processes include those disclosed in Priedeman et al., U.S. Pat. No. 8,123,999; and in Zinniel, U.S. Pat. No. 8,765,045.

Figure 5:
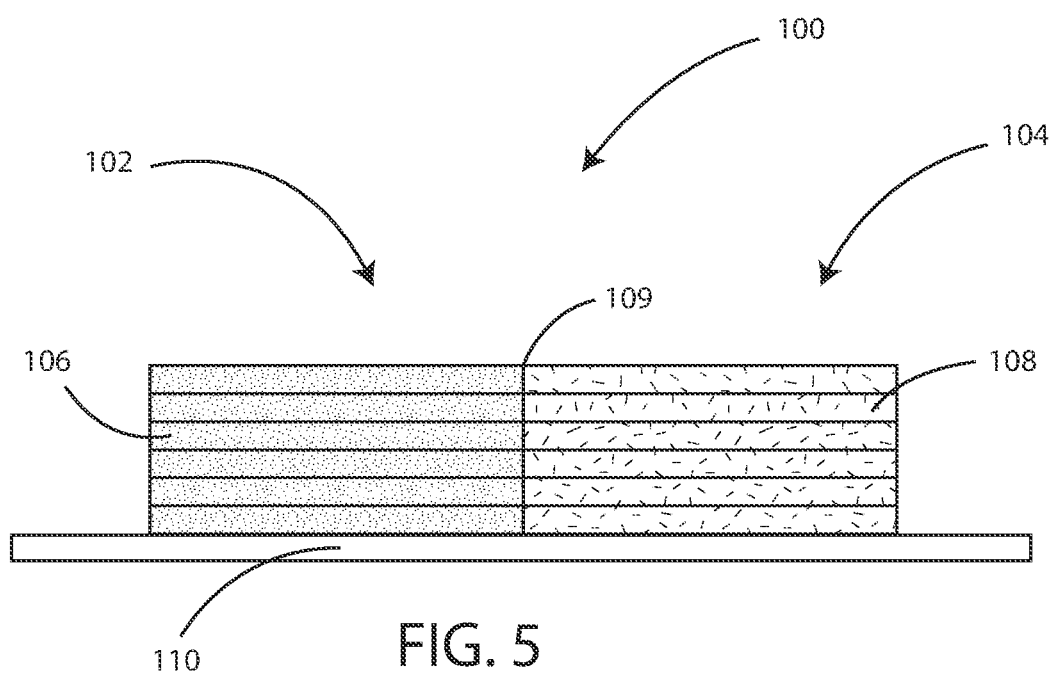
FIG. 5 is a schematic view of an idealized multi-layer composite containing layers of part material and support material.

Referring now to FIG. 5, a schematic view of an idealized multi-layer composite 100 containing layers of part material 102 and support material 104 are shown. The part material 102 and support material 104 are deposited as layers onto build substrate 110. The part material layers 106 and support material layers 108 are built up to form the overall composite 100. It will be appreciated that the part material layers 106 and support material layers 108 are not shown to scale, and in practice the layers 106, 108 are very thin, typically on the order of 10 to 25 microns. In the embodiment shown the part material 102 and support material 104 meet together at an interface 109.

Figure 6:
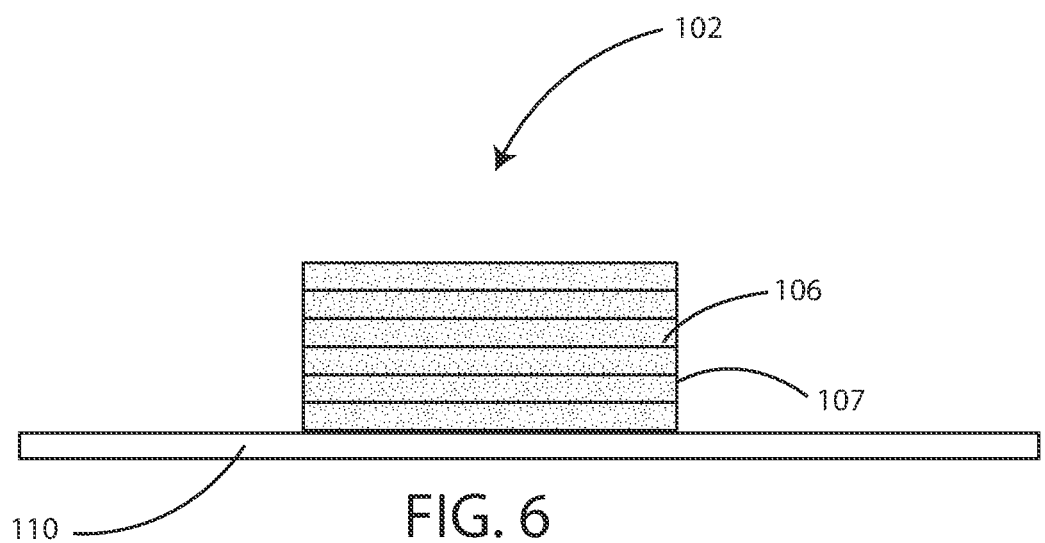
FIG. 6 is a schematic view of an idealized multi-layer composite containing layers of part material after removal of support material.

FIG. 6 is a schematic view of part material 102 of FIG. 5, showing the part material 102 after removal of the support material 104 from FIG. 5. Here the part material 102 remains behind, with an exposed surface 107 of the part material 102 depicted with a smooth and uniform surface. Layers 106 of part material 102 are still shown, although it will be appreciated that in typical embodiments those layers are difficult to discern without close inspection. It will be appreciated that in practice the exposed surface 107 will often have some surface texture or roughness that is not desired because the layers do not generally get deposited quite as precisely as desired.

Figure 7:
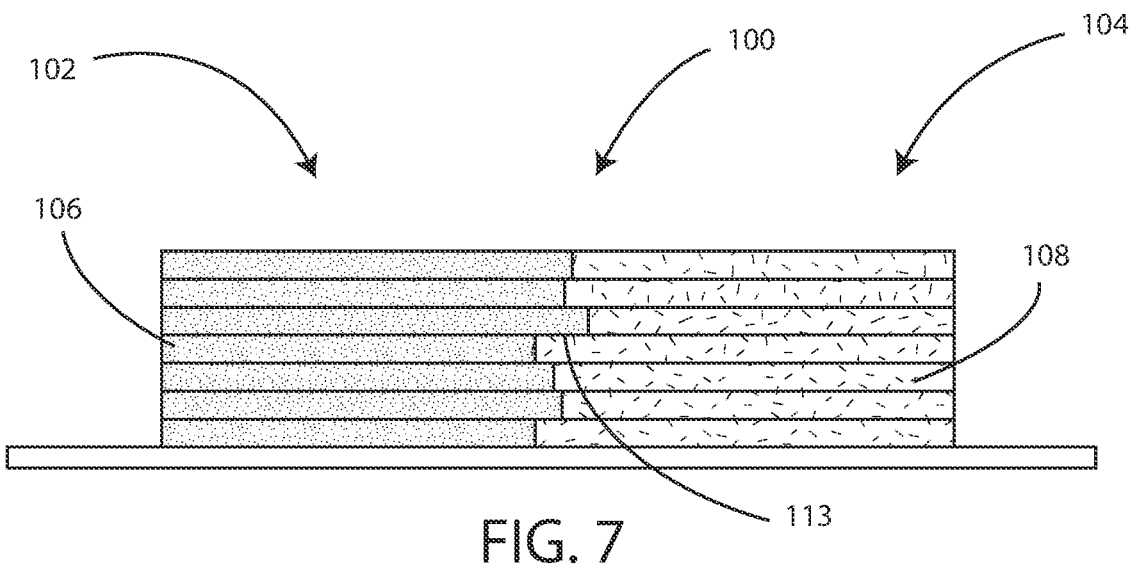
FIG. 7 is a schematic view of a multi-layer composite containing layers of part material and support material.
Figure 8:
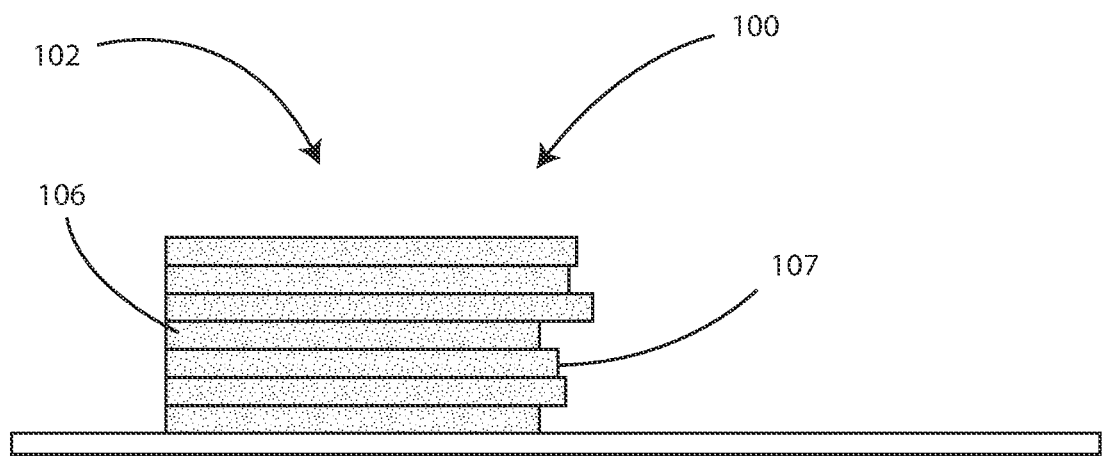
FIG. 8 is a schematic view of a multi-layer composite containing layers of part material of FIG. 7 after removal of support material.

FIG. 7 and FIG. 8 show an additional example of a common challenge with regard to forming a multi-layer composite 100 in which layers of part material 102 and support material 104 are deposited as part layers 106 and support material layers 108, in this case overlap of layers. The result is small overlapping areas 113 between some of the part material layers 106 and support material layers 108. Although the part material layers 106 and support material layers 108 are often deposited with relatively high precision, it is still possible for these overlapping areas 113 to form due to variations in registration of the layers as they are deposited. The result, as shown in FIG. 8, after removal of the support material 104, can be a part material 102 with an exposed surface 107 that is not as smooth as desired. As noted above, these figures are schematic representations of the surface irregularities, and the actual finished part will show its imperfections in regard to roughness of the surface. This roughness is often more visible to the eye or to optical roughness measurement techniques than it is to a stylus roughness measuring instrument because the imperfections are formed by such small layers and those layers are somewhat flexible, and those not as easily measured as rough.

Figure 9:
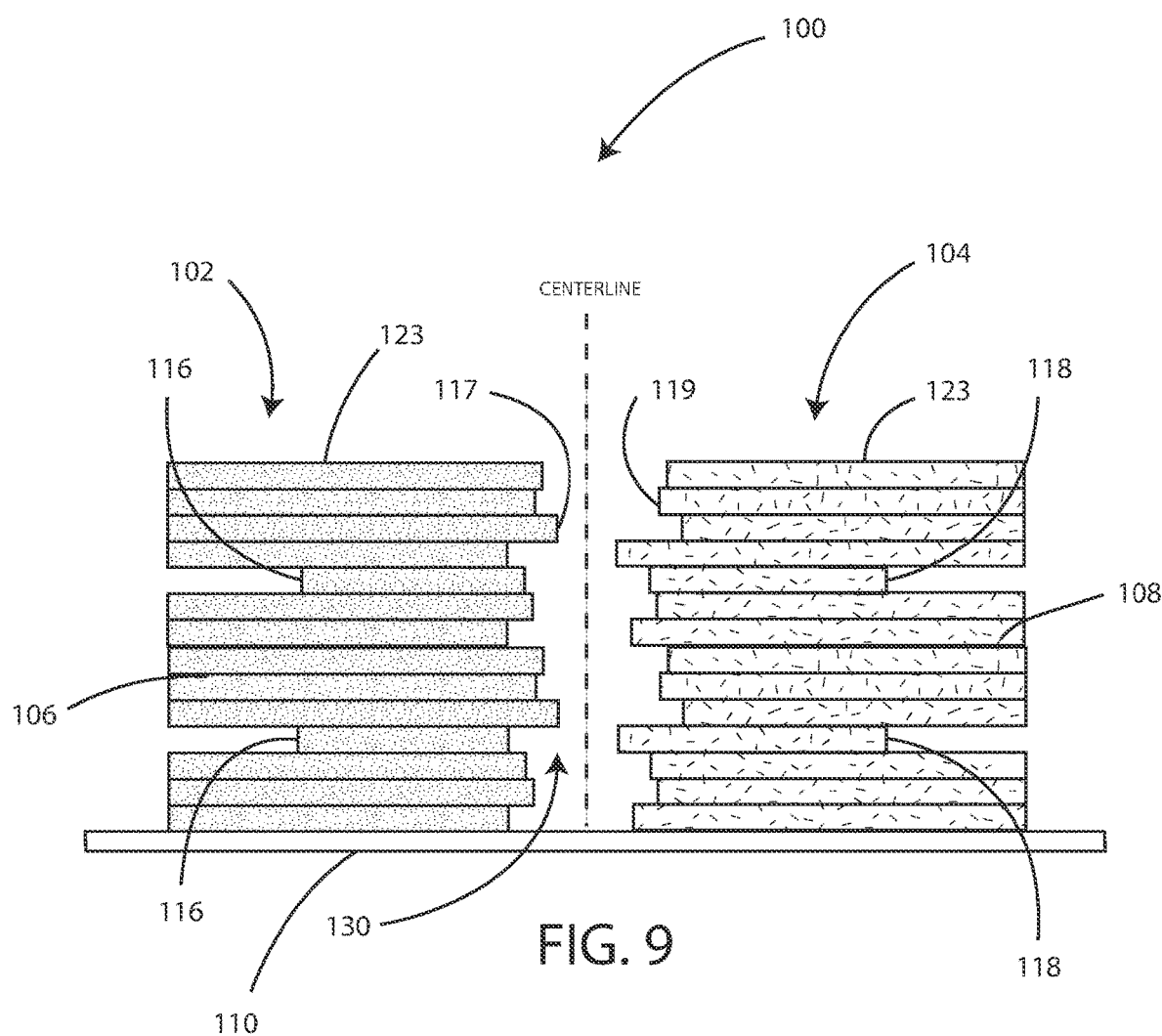
FIG. 9 is a simplified schematic view of a multi-layer composite containing layers of part material and support material.
Figure 10:
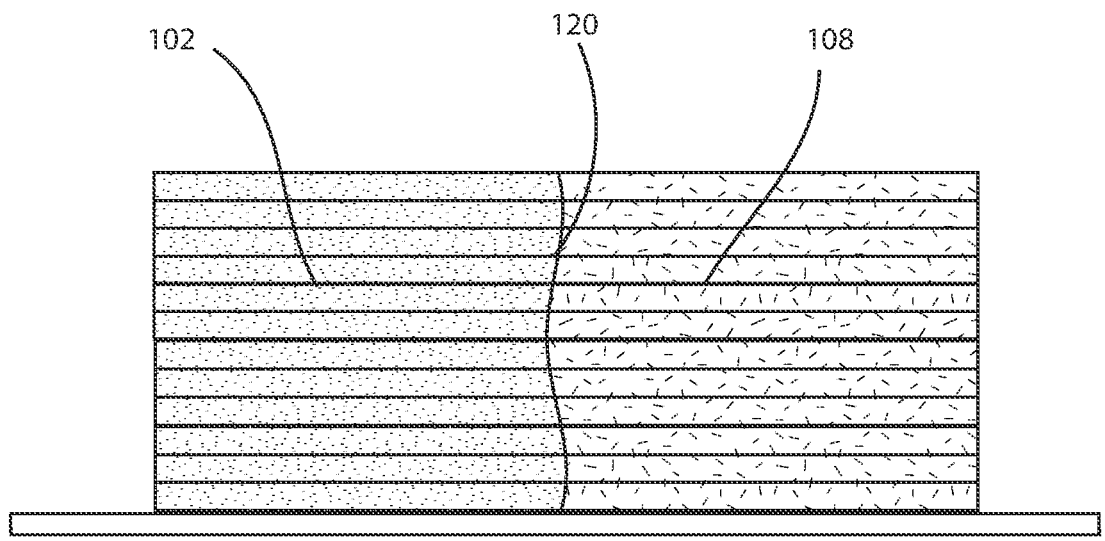
FIG. 10 is a simplified schematic view of a multi-layer composite containing layers of part material and support material of FIG. 9 before removal of support material.
Figure 11:
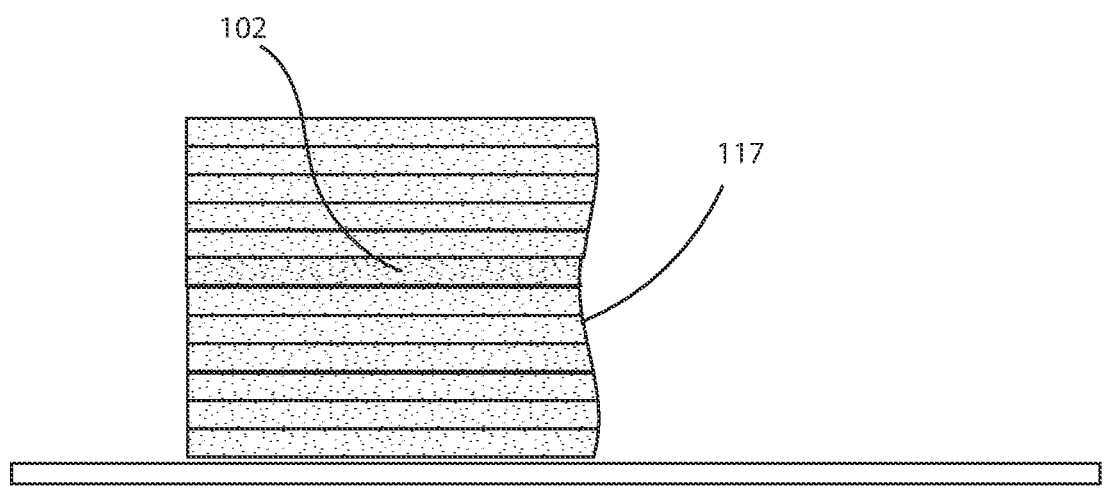
FIG. 11 is a simplified schematic view of a multi-layer composite containing layers of part material of FIG. 10 after removal of support material.

FIGS. 9 to 11 show how the interface between the part material 102 and support material 104 can be improved by depositing the part and support material in layers that are separated from one another by a short distance that forms a gap (also referred to as a trench), and how the application of heat and pressure to the top of the composite part and support layers (as the layers are built up) results in a flow of part and support material into the gap in a manner that results in a smooth interface forming between the parts.

More specifically, FIG. 9 is a schematic view of a multi-layer composite containing layers of part material 102 and support material 104 showing a gap 130 between the layers. This gap is formed intentionally to create a volume into which part material 102 and support material 104 can flow during the production process under pressure and at elevated temperatures. In the depicted embodiment each of the part material 102 and support material 104 include build material edge enhancement layers 116 and support material enhancement layers 118. These edge enhancement layers 116 and 118 are layers of part and support material that are configured to promote flow into the gap 130 between the part material 102 and support material 104. These edge enhancement layers 116, 118 are generally partial layers of build material 102 and support material 104 positioned between larger layers 106, 108. The part material layers 106, 116 of the part material 102 define a part material surface 117 opening into the gap 130; while the support material layers 108, 118 of support material 104 define a support material surface 119 opening into the other side of gap 130. Each of part material surface 117 and support material surface 119 will typically have some irregularities due to registration, such as the irregularities. It will be noted that FIG. 9 is a superposition of as-printed layers, and not would result from actually transfusing these layers together. FIG. 10, shows a simplified, schematic result after transfusion (the enhancement layers have disappeared, and the gap has filled up). Note that FIG. 10 shows a simplified flow into the gap, wherein typically there will be some upward flow of the material in the gap region during transfusion.

During the transfusion process, as heat and pressure is applied to the top surfaces 123 of the composite 100, and combined with heat within the layers from their earlier deposition (and optionally the addition of heat), there is a flow of part material and support material into the gap 130 (as noted above, this flow generally has at least a component that is normal to the plane formed by the deposited layers. That normal flow component is not shown in this figure). As the layers of build material and support material are built up and pressure is applied from above, the additional material from the edge enhancement layers promotes a horizontal undertow flow resulting in movement horizontal (with some downward) movement of material into the gap 130. The material flowing into the gap 130 is generally both from the edge enhancement layers 116, 118 themselves, but also from the regular layers 106, 108. Thus, the edge enhancement layers promote flow of part and support material in layers 106, 108 adjacent to the gap 130. As the part and support material flows into the gap 130 there is generally an upward flow of material within the gap because lower portions of the gap will have already been filled with material from prior edge enhancement flows. Thus, for example, it is typically observed that the part material 102 will not just flow into the gap 130, but will flow inward and upward along the gap. A similar flow trait of inward and upward is generally observed by the support material 104. It is necessary to provide for proper amounts of flow to promote this upward flow within the gap 130. Generally this can be accomplished such that the overall volume of the edge enhancement layers corresponds approximately to the overall volume of the gap between the two materials. Note that in many implementations the volume of the part edge enhancement layers 116 will be the same as the volume of the support edge enhancement layers 118; although in some implementations there can be larger edge enhancement layers formed form either the part or support material. In such implementations the flow will be such that the contact line between the two materials is typically offset from the center toward the material having smaller edge enhancement layers.

As the edge support layers 116 and 118 converge through inward and upward movement, the irregularities in the surfaces 117 and 119 are smoothened over at a convergence position 120, shown in FIG. 10. Note that the upward movement of the material within the gap 130 is not shown in FIG. 10, although such movement typically occurs (see FIGS. 12 to 14, below, for a simplified flow representation). FIG. 11 in turn is a schematic view of layers of part material from FIG. 10 after removal of support material 108, leaving behind part material 102 having surface 117 that is typically significantly smoother than would be observed with surface 117 prior to the reflow of the edge enhancement layers. Again, the direction of flow is not shown in FIG. 11. Also, although surface 117 shows some surface variation, that variation is less than would be generally encountered without the present process.

Figure 12:
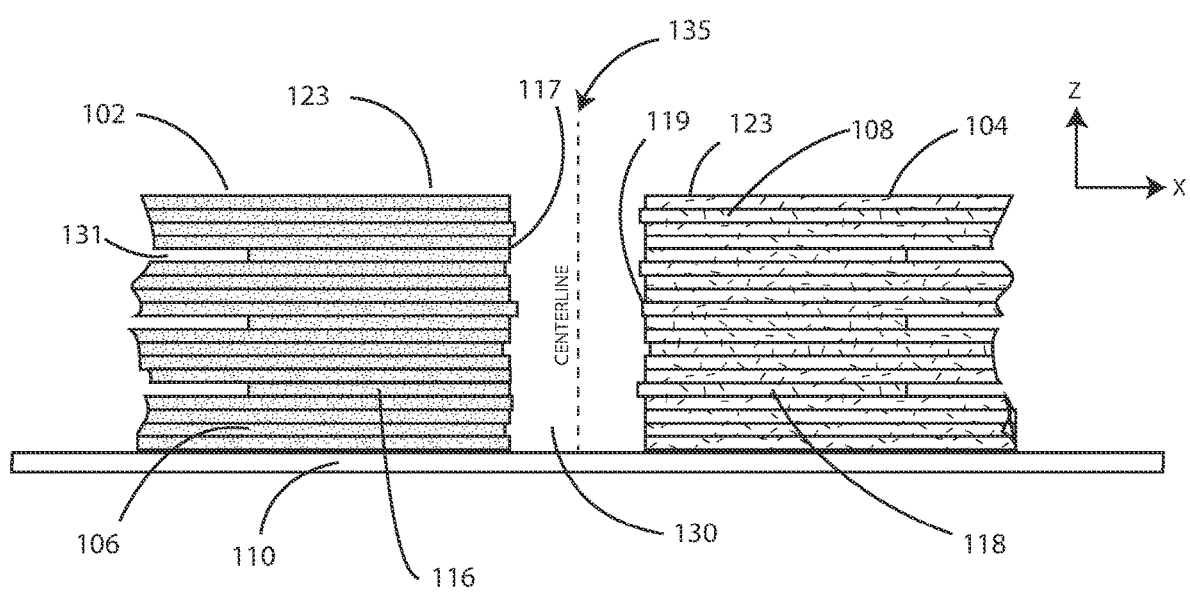
FIG. 12 is a schematic view of a multi-layer composite containing layers of part material and support material showing a gap between the layers.
Figure 13:
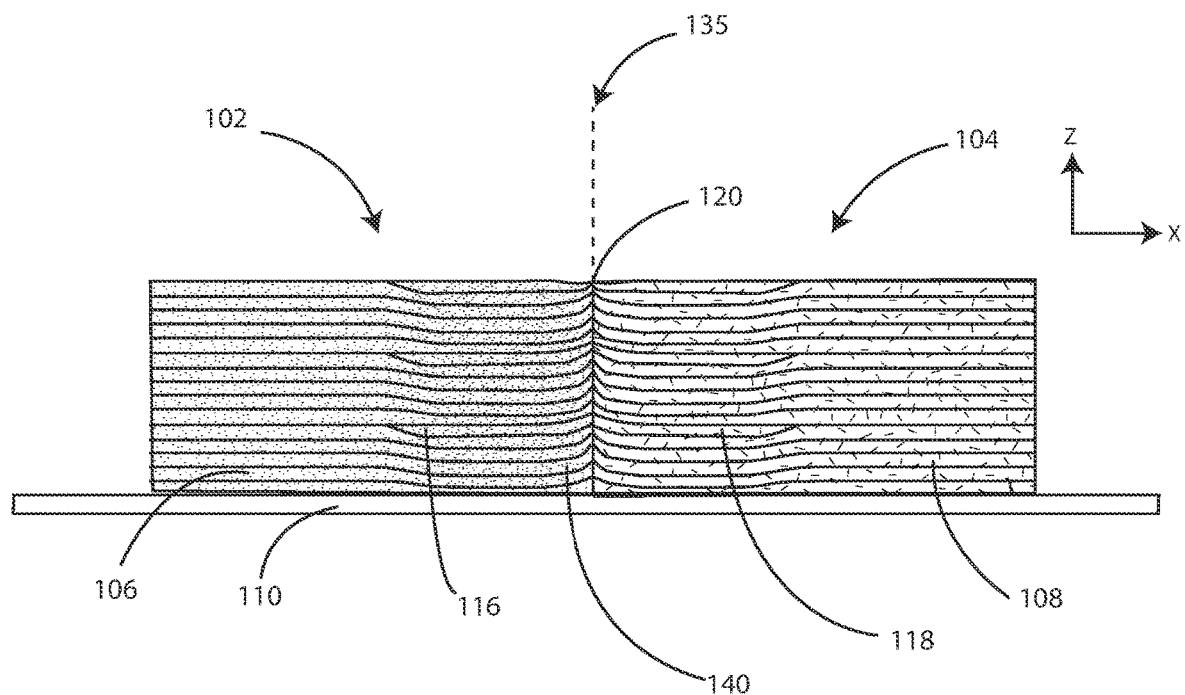
FIG. 13 is a schematic view of a multi-layer composite containing layers of part material and support material of FIG. 12, showing the gap closed with part material and support material.
Figure 14:
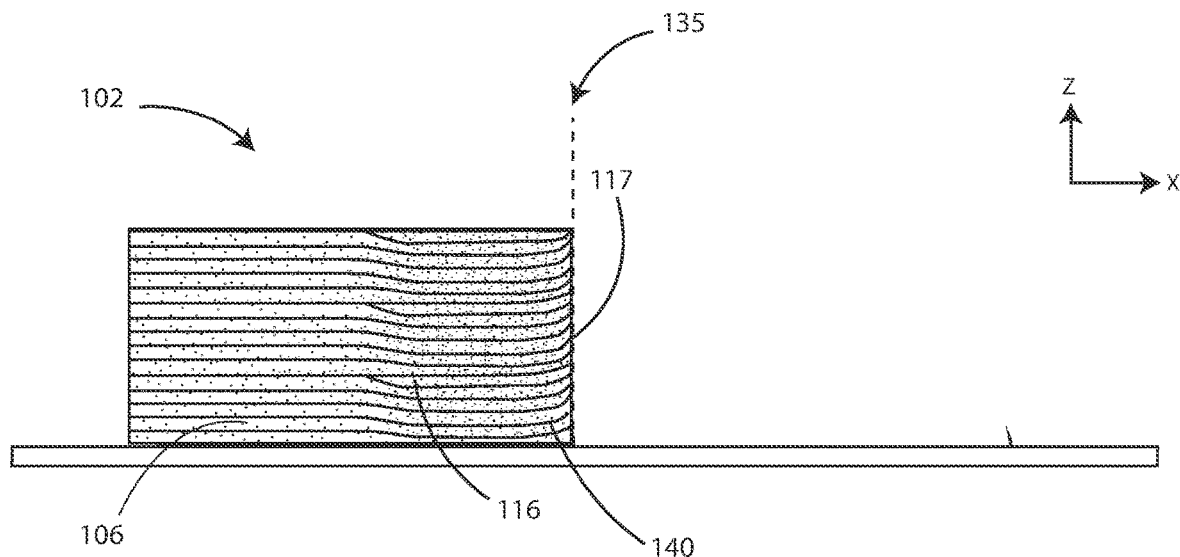
FIG. 14 is a schematic view of layers of part material from FIG. 13 after removal support material.

Now in reference to FIGS. 12 to 14, the flow properties, including the upward flow of material within the gap, is represented in additional detail. FIG. 12 is a schematic view of a multi-layer composite containing layers of part material 102 and support material 104 showing a gap 130 between the layers that is formed intentionally to create a volume into which part material 102 and support material 104 can flow during the production process under pressure and at elevated temperatures. In the depicted embodiment each of the part material 102 and support material 104 include build material edge enhancement layers 116 and support material enhancement layers 118. These edge enhancement layers 116 and 118 are layers of part and support material that are configured to flow into the gap 130 between the part and support material 102, 104, meeting approximately at the depicted centerline in the example embodiment. These edge enhancement layers 116, 118 are generally partial layers positioned between larger layers 106, 108. The layers 106, 116 of the part material 102 define a surface 117 opening into the gap 130; while the layers 108, 118 of part material 104 define a surface 119 opening into the other side of gap 130. It will be appreciated that the layers are shown schematically, and in practice they are deposited on top of one another without a space between layers. Thus, referring to FIG. 12, the appearance of a space 131 is only representing differences in layers. In fact, there is no such space in the actual deposited layers since they are pressed together during the transfusion process.

The number and dimensions of the edge enhancement layers will often vary depending upon the application. Generally, it is desired that the edge enhancement layers will have a total volume that will occupy the gap 130 upon application of pressure and heat. In other words, the edge enhancement layers 116 and 118 should, in aggregate, have sufficient volume that upon displacement of material into the gap 130 they will full fill the gap 130. Note, the edge enhancement layers themselves do not entirely fill the gap 130, but rather they promote flow into the gap by creating a higher pressure region at the edge of the gap 130, and this higher pressure results in flow of build and support material into the gap 130. Some of that material that flows into the gap will have been deposited as an edge enhancement layer, but generally there is greater flow of material from the other layers because there are more of those other layers. In some constructions the edge enhancement layers 116, 118 will be spaced every few regular part layers 106 and support layers 108; such as every 5 layers. However, in other implementations the edge enhancement layers 116, 118 will be more frequent or less frequent, such as every 2, every 3, every 4, every 6, every 7, every 8 or every 10 layers.

During the transfusion process, as pressure is applied to the top surfaces 123, and combined with heat within the layers from their earlier deposition (and optionally the addition of heat), there is a flow of part material and support material into the gap 130. As the layers are built up and pressure is applied, the areas where an edge enhancement layer are present have flow into the gap 130, this flow into the gap (primarily horizontal but also downward) includes material from layers beneath the edge enhancement layer, effectively producing an undertow of horizontal and downward movement of material into the gap 130. The material that moves into the gap then moves inward and upward upon reaching the gap until the part and support material converges. Thus, it is typically observed that the edge enhancement layer 116 and material from adjacent layers formed of part material 102 will not just flow into the gap 130, but will flow upward into the gap. A similar flow trait of inward and upward is generally observed by the support material 104.

The result of that upward flow is depicted by layer outlines in FIG. 13, shown as if the layers could be distinguished after transfuse. As the edge support layers 116 and 118 converge through inward and upward movement the irregularities in the surfaces 117 and 119 are smoothened over at convergence position 120, shown in FIG. 13. FIG. 14 in turn is a schematic view of layers of part material from FIG. 13 after removal support material 104, leaving behind part material 102 having surface 117 that is typically significantly smoother than would be observed with surface 117 prior to the reflow resulting from the presence of the edge enhancement layers.

The part and support material flows toward a convergence line 135 in FIG. 13; although it will be appreciated that the centerline refers to an interface where the layers come together, and in practice that interface can be closer to one side or the other—so closer to either the part material 102 or support material 104. The part and support material can have different viscosities and flow properties, in which case the point of interface is not necessarily the center between them.

Figure 15:
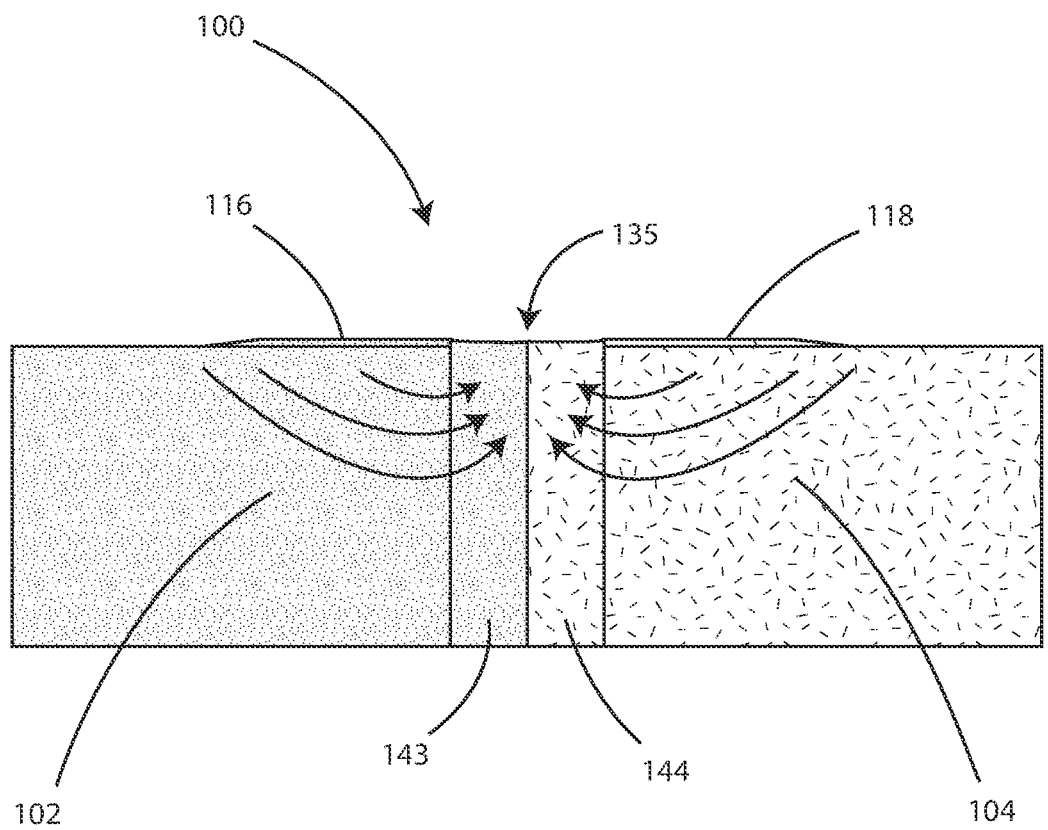
FIG. 15 is a schematic view of a composite part, showing generalized material flow properties.

FIG. 15 is a schematic view of a composite part 100, showing generalized material flow properties. Showing edge enhancement layers 116, 118 along with part material 102 and support 104. The application of heat and pressure onto edge enhancement layers 116, 118 results in areas beneath them in part material 102 and support material 104 being subject to increased pressure, resulting in flow of material into the gap, with part of the gap filled with part material inflow 143 and part of the gap filled with support material inflow 144. The arrowed lines show general directions of material flow, with the predominant flow directions being horizontal and (and downward) undertow within the original areas occupied by support and part material; and subsequent horizontal and upward flow upon entry into the gap area, converging at a convergence line 135. It will be understood that this is a schematic diagram, thus the relative size, thickness and proportions of the layers, including the edge enhancement layers 116, 118 and the height of the material filling the gap is not intended to be representative of all real-life implementations.

Figure 16:
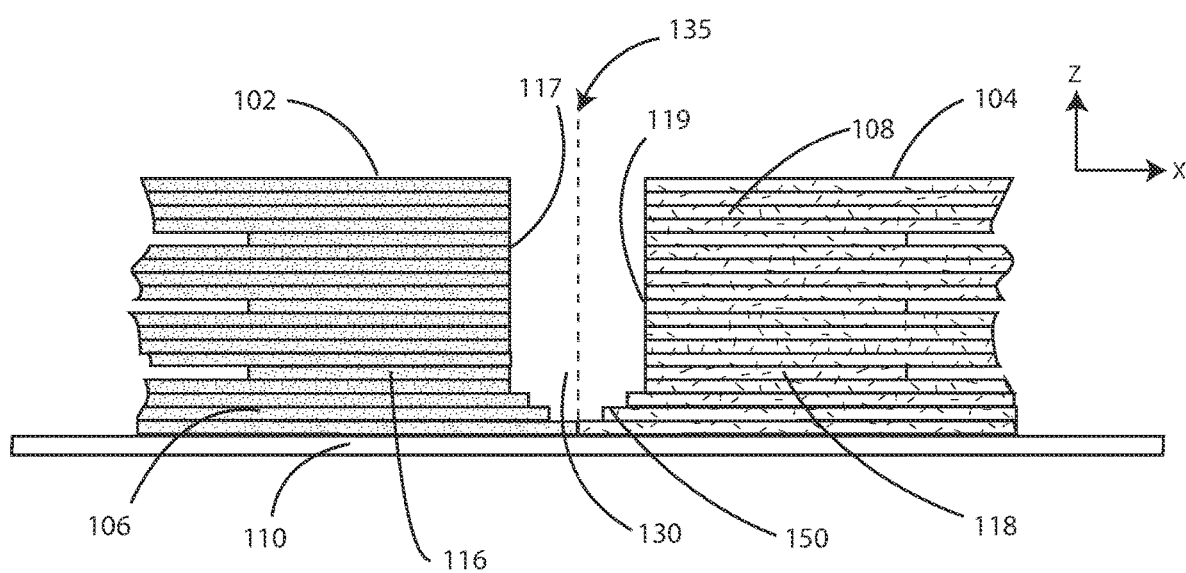
FIG. 16 is a schematic view of a multi-layer composite containing layers of part material and support material showing a gap between the layers.

FIG. 16 is a schematic view of a multi-layer composite containing layers of part material 102 and support material 104 showing a gap 130 between the layers that is formed intentionally to create a volume into which part material 102 and support material 104 can flow during the production process under pressure and at elevated temperatures. In addition, the bottom layers 150 of part material 102 and support material 104 are printed within the gap 130 to further promote upward flow of the upper level layers as they flow into the gap 130. In the depicted embodiment each of the part material 102 and support material 104 include build material edge enhancement layers 116 and support material enhancement layers 118. These edge enhancement layers 116 and 118 are layers of part and support material that are configured to promote flow of part and support material into the gap 130 between the part and support material 102, 104. As discussed above, these edge enhancement layers 116, 118 are generally partial layers position between larger layers 106, 108. The layers 106, 116 of the part material 102 define a surface 117 opening into the gap 130; while the layers 108, 118 of support material 104 define a surface 119 opening into the other side of gap 130. The deposition of the bottom layers 150 into the gap area 130 provide for lower portions of the gap 130 to be filled, thereby necessitating the upward flow of material upon entering the gap.

Figure 17:
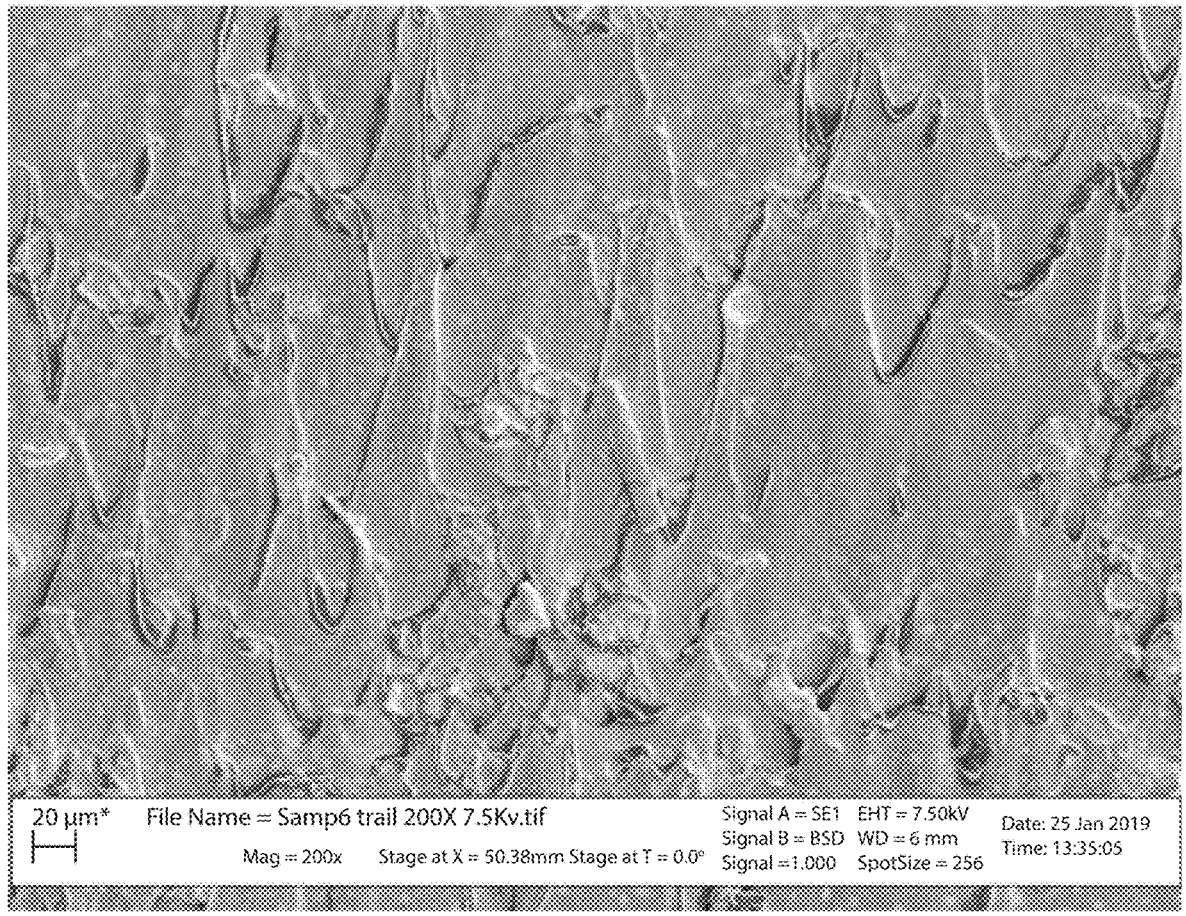
FIG. 17 is an electron micrograph of a build material having improved surface finish from edge enhancement in accordance with the present disclosure.

FIG. 17 is an electron micrograph of a part formed of build material having improved surface finish from edge enhancement in accordance with the present disclosure. As can be seen from FIG. 17, the surface has a somewhat vertically-smeared microtexture resulting from the upward flow of the build material. This smeared surface removes the texture present from the different layers of part material as they are deposited, resulting in a significantly smoother surface than otherwise obtained. Removal of this smeared surface can reveal the underlying layers of deposited part material. Thus, one means of assessing whether the present process was used is to examine for a surface having layers demonstrating smoothing as shown in FIG. 17. Another means is to inspect the part volume adjacent to vertical walls for the presence of trapped voids or contaminants that show residual distortion from the vertical shear process. It will be the gaps need not be vertical. For example, in a typical embodiment an example layer n can have some overlap along the gaps of layers n−1 and n+1 (layers below and above), but they do not always have the same X-Y position, and they do not always need to be oriented in the X or the Y direction.

Figure 18:
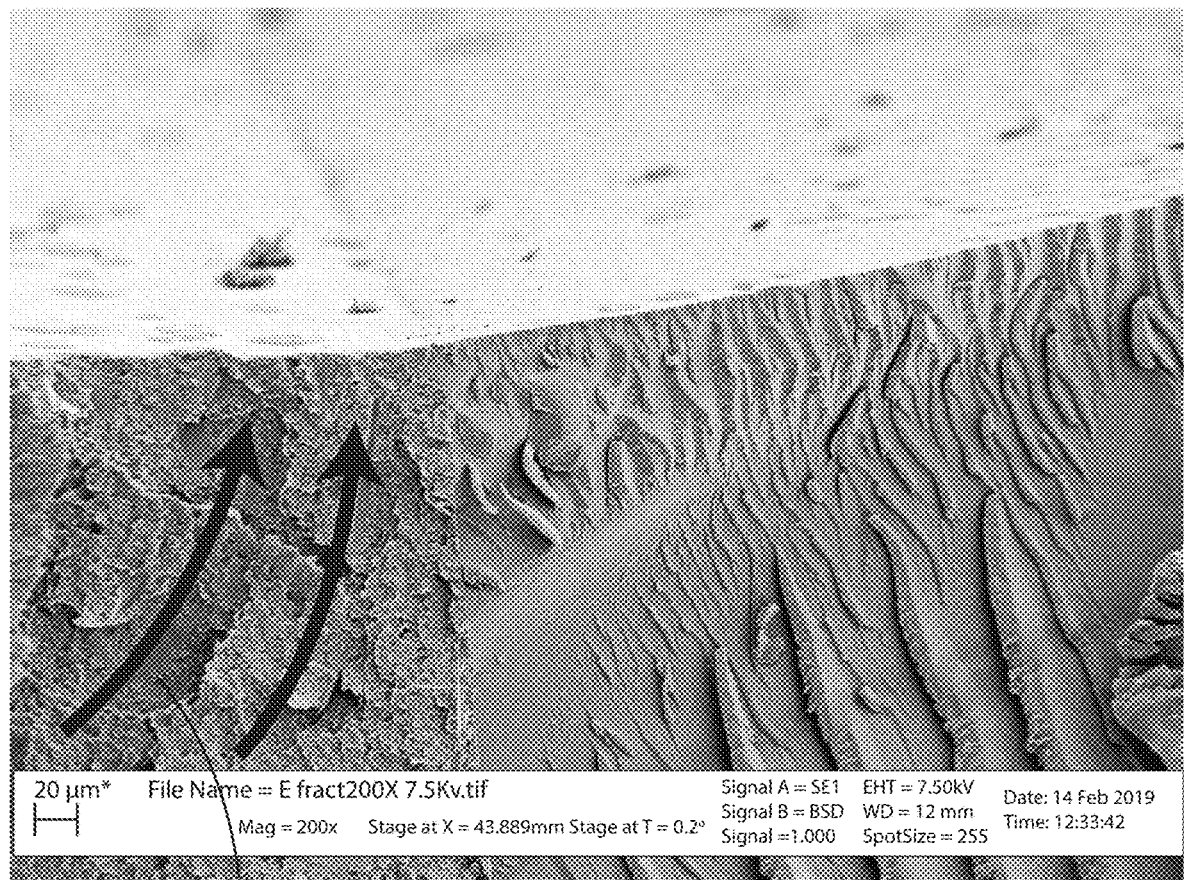
FIG. 18 is an electron micrograph of a cut-away portion of part material and support material, showing evidence of upward flow of the material.

FIG. 18 is an electron micrograph of a cross section of portion of composite formed of a part material and support material, in particular showing the gap area where the pat and support material converged. FIG. 18 shows evidence of upward flow of the part material indicated by super-imposed arrows. The upward flow direction depicts the upward flows 140 of schematic FIG. 18. These upward flows are not always readily visible in the finished part, since they are obscured by the fact that they are formed of a single material (either part material or support material) and are obscured under the surface of the finished part. However, FIG. 18 does show the manner in which the flow of material occurs, and in combination with FIG. 17 shows how the surface is smoothened as a result of this flow.

Although the present disclosure has been described with reference to preferred embodiments, workers skilled in the art will recognize that changes may be made in form and detail without departing from the spirit and scope of the disclosure.

What is claimed is:

1. A method for printing an article using a selective toner electrophotographic process, the method comprising:
    successively depositing multiple layers of part material and support material, the layers deposited substantially parallel to a first plane; wherein:
    a) the multiple layers of part material and support material extend in a direction perpendicular to the first plane; and
    b) at least some of the layers of part material and support material are separated from each other in the first plane to form a gap between part material and support material within a layer;
    deposit of an edge enhancement layer between at least some of the multiple layers of part material and support material; the edge enhancement layer comprising a layer of part material or a layer of support material selectively printed adjacent to the gap of a previous layer;
    application of heat and pressure to the part material and support material such that a portion of the part material and support material flows into and at least partially fills the gap between the part material and support material.

2. The method of claim 1, wherein the first plane comprises the X-Y plane.

3. The method of claim 1, wherein at least a portion of a flow vector of the part material or support material within the gap includes a component outside of the first plane.

4. The method of claim 1, wherein an aggregate volume of printed part material or support material of the edge enhancement layers have a volume substantially equal to a volume of the gap.

5. The method of claim 1, wherein the edge enhancement layer is deposited on average
    every second, third, fourth, fifth, sixth, seventh, eighth, ninth, or tenth layer.

6. The method of claim 1, wherein the edge enhancement layer has an average width of 5 to 15 pixels.

7. The method of claim 1, wherein an average width of the gap between the part material and support material is from 6 to 12 pixels.

8. The method of claim 1, wherein the gap is from 6 to 12 pixels in width and an average width of the edge enhancement layer is from 10 to 20 pixels in width.

9. The method of claim 1, wherein an average width of the gap between the part material and support material is from 5 to 25 pixels.

10. The method of claim 1, further comprising reheating, compressing, and recooling a build surface so as to cause the gap to diminish and a part region surface to become progressively smoother.

11. The method of claim 1, wherein a surface roughness of vertical part surfaces is less than 2 um.

12. A method for printing an article using a selective toner electrophotographic process, the method comprising:
    successively depositing multiple layers of part material and support material, the layers deposited substantially parallel to an X-Y plane; wherein:
    a) multiple layers of part material and support material extend in a Z-direction perpendicular to the X-Y plane; and
    b) at least some of the layers of part material and support material are separated from each other in the X-Y plane to form a gap between part material and support material within a layer;
    deposit of an edge enhancement layer between at least some of the multiple layers of part material and support material; the edge enhancement layer comprising a layer of part material and/or a layer of support material selectively printed adjacent to the gap of a previous layer; and
    application of heat and pressure to the part material and support material such that a portion of the part material and support material flows into and at least partially fills the gap between the part material and support material.

13. The method of claim 12, wherein at least a portion of the part material and/or support material flows upward in the Z-direction with a component normal to the X-Y plane within the gap.

14. The method of claim 12, wherein at least a portion of the part material or support material has a flow vector component outside of the X-Y plane.

15. The method of claim 12, wherein an aggregate volume of part material or support material of the edge enhancement layers has a volume substantially equal to a volume of the gap.

16. The method of claim 12, wherein the edge enhancement layer is deposited on average
    every second, third, fourth, fifth, sixth, seventh, eighth, ninth, or tenth layer.

17. The method of claim 12, wherein the gap is from 6 to 12 pixels in width and the average width of the edge enhancement layer is from 10 to 20 pixels in width.

18. The method of claim 12, wherein the average width of the gap between the part material and support material is from 5 to 25 pixels.

19. The method of claim 12, further comprising reheating, compressing, and recooling a build surface so as to cause the gap to diminish and a part region surface to become progressively smoother.

20. A method for printing an article using a selective toner electrophotographic process, the method comprising:
    successively depositing multiple layers of part material and support material, the layers deposited substantially parallel to an X-Y plane; wherein:
    a) the multiple layers of part material and support material extend in a Z-direction perpendicular to the X-Y plane; and
    b) at least some of the layers of deposited part material and support material are offset from each other in an X or Y direction to form a gap substantially free of part material and support material between the layers of part material and layers of support material, wherein a mass of part material and support material is higher adjacent to the gap than distant from the gap prior to application of heat and pressure; and application of heat and pressure to the part material and support material such that a portion of the part material and support material flows into and at least partially fills the gap between the part material and support material.

* * * * *